(12) United States Patent
Sugishita et al.

(10) Patent No.: US 7,819,105 B2
(45) Date of Patent: *Oct. 26, 2010

(54) POWER TRANSMISSION MECHANISM BETWEEN ENGINE STARTING DEVICE AND ENGINE

(75) Inventors: Yuu Sugishita, Saitama (JP); Minoru Shibasaki, Tokyo (JP)

(73) Assignees: Starting Industrial Co., Ltd., Tokyo (JP); Husqvarna Zenoah Co., Ltd., Kawagoe-shi, Saitama (JP)

( * ) Notice: Subject to any disclaimer, the term of this patent is extended or adjusted under 35 U.S.C. 154(b) by 144 days.

This patent is subject to a terminal disclaimer.

(21) Appl. No.: 11/883,664

(22) PCT Filed: Feb. 2, 2006

(86) PCT No.: PCT/JP2006/301787

§ 371 (c)(1),
(2), (4) Date: Aug. 3, 2007

(87) PCT Pub. No.: WO2006/085473

PCT Pub. Date: Aug. 17, 2006

(65) Prior Publication Data

US 2008/0115756 A1 May 22, 2008

(30) Foreign Application Priority Data

Feb. 8, 2005 (JP) ............................. 2005-031341

(51) Int. Cl.
*F02N 1/00* (2006.01)
*F02N 15/04* (2006.01)

(52) U.S. Cl. ....................................... 123/185.14; 74/8

(58) Field of Classification Search ............ 123/185.14; 74/8
See application file for complete search history.

(56) References Cited

U.S. PATENT DOCUMENTS 3,010,443 A * 11/1961 Lyvers ................... 123/185.14
3,861,374 A * 1/1975 Dooley et al. .......... 123/185.14
4,104,927 A * 8/1978 Jensen et al. ........... 123/185.14
4,480,605 A 11/1984 Bloemers (Continued)

FOREIGN PATENT DOCUMENTS

JP 1-91075 6/1989

(Continued)

*Primary Examiner*—Stephen K Cronin
*Assistant Examiner*—David Hamaoui
(74) *Attorney, Agent, or Firm*—McDermott Will & Emery LLP

(57) ABSTRACT

A power transmission mechanism between an engine starter and an engine capable of securely engaging the ratchet wheel of a rotatingly driven part with the lever-like engagement/disengagement member of a centrifugal clutch mechanism when the engine is started. The side face of the lever-like engagement/disengagement member facing the ratchet teeth of a second ratchet part is formed in such a shape that is recessed in a direction apart from the peripheral surface of the second ratchet part in an area starting at its pivoting part toward an engagement/disengagement claw part. The engagement/disengagement claw part formed at the tip of the lever-like engagement/disengagement member is engaged with the ratchet teeth of the second ratchet part by surface contact, and the ratchet teeth of a first ratchet part and the ratchet teeth of the second ratchet part are disposed at a prescribed phase difference.

14 Claims, 20 Drawing Sheets

U.S. PATENT DOCUMENTS

| | | | |
|---|---|---|---|
| 4,582,030 A | 4/1986 | Reese | |
| 4,970,998 A * | 11/1990 | Tyler | 123/185.3 |
| 5,163,392 A | 11/1992 | Morishima et al. | |
| 5,186,134 A * | 2/1993 | Morishima et al. | 123/185.14 |
| 5,537,966 A * | 7/1996 | Ohnishi | 123/185.14 |
| 6,263,852 B1 | 7/2001 | Gracyalny et al. | |
| 6,325,036 B1 | 12/2001 | Gracyalny et al. | |
| 6,386,169 B1 * | 5/2002 | Gracyalny et al. | 123/185.14 |
| 6,508,220 B1 * | 1/2003 | Akaike et al. | 123/185.14 |
| 6,615,787 B2 | 9/2003 | Gracyalny | |
| 6,679,217 B2 | 1/2004 | Nieda et al. | |
| 6,827,055 B2 | 12/2004 | Tsunoda et al. | |
| 6,901,899 B2 | 6/2005 | Tsunoda et al. | |
| 7,252,065 B1 * | 8/2007 | Keeton | 123/185.14 |
| 2002/0121258 A1 | 9/2002 | Nieda et al. | |
| 2002/0157632 A1 | 10/2002 | Nemoto et al. | |
| 2002/0174848 A1 | 11/2002 | Nieda et al. | |
| 2004/0016311 A1 * | 1/2004 | Hashiba | 74/8 |
| 2005/0252477 A1 * | 11/2005 | Schriever et al. | 123/185.14 |
| 2008/0283017 A1 * | 11/2008 | Sugishita et al. | 123/185.14 |

FOREIGN PATENT DOCUMENTS

| | | |
|---|---|---|
| JP | 1191075 A | 6/1989 |
| JP | 1139080 A | 9/1989 |
| JP | 5223025 A | 8/1993 |
| JP | 2001132591 A | 5/2001 |
| JP | 200165435 B1 | 7/2002 |
| JP | 2002327666 A | 11/2002 |
| JP | 2003269300 A | 9/2003 |
| JP | 2004068639 A | 3/2004 |
| JP | 2004116388 A | 4/2004 |
| JP | 2004263615 A | 9/2004 |
| JP | 2005337224 A * | 12/2005 |
| JP | 2005351188 A | 12/2005 |

* cited by examiner

POWER TRANSMISSION MECHANISM BETWEEN ENGINE STARTING DEVICE AND ENGINE

CROSS-REFERENCE TO RELATED APPLICATIONS

This is a U.S. national phase application under 35 U.S.C. §371 of International Patent Application No. PCT/JP2006/301787 filed Feb. 2, 2006 and claims the benefit of Japanese Application No. 2005-031341 filed on Feb. 28, 2005. The International Application was published in the Japanese language on Aug. 17, 2006 as International Publication No. WO 2006/085473 under PCT Article 21(2).

TECHNICAL FIELD

The present invention relates to a power transmission mechanism between an engine starting device and an engine which can instantaneously start the engine by releasing a spring force accumulated in a damping and accumulating portion so as to rotate a rotation driven portion.

BACKGROUND ART

A manual starting device of an internal combustion engine generally rotates a rope reel by pulling a recoil rope and executes an engine start by transmitting the rotation of the rope reel to a crank shaft of the engine. However, in this kind of engine starting device, not only it is necessary to pull the recoil rope in a state of making a pulling speed of the recoil rope higher to some degree, but also a pulling length is long. Accordingly, it is often the case that a great aged person and a weak person can not easily start the engine. Then, the engine starting device by which even the person having a small pulling force of the recoil rope can easily start the internal combustion engine has proposed, for example, by Japanese Utility Model Application Laid-Open No. 1-91075 (patent document 1), Japanese Patent Application Laid-Open No. 2001-65435 (patent document 2) and the like.

Among them, in accordance with the engine starting device of the patent document 1, there are provided with a recoil drum around which a recoil rope is wound, a first power spring energizing in a direction of winding the recoil rope around the recoil drum, a first ratchet formed in the recoil drum, a second ratchet engaging with a second ratchet pawl provided in a crank shaft of the engine at a time of rotating in the engine starting direction, a second power spring coupled to the second ratchet and accumulating a spring force rotating the ratchet in the engine starting direction, a first ratchet pawl provided in the second ratchet, engaging with the first ratchet, transmitting the rotation of the recoil drum to the second power spring via the second ratchet, and accumulating the spring force in the power spring, and a stopper member detachably engaging with the second ratchet and inhibiting the rotation of the second ratchet generated by the spring force of the second power spring, which are arranged coaxially.

In order to start the engine by means of the starting apparatus, the stopper member is previously engaged with the second ratchet, a sufficient force is accumulated in the second power spring by pulling the recoil rope at a proper frequency so as to rotate the recoil drum, and the engagement between the stopper member and the second ratchet is detached at a time of starting the engine, thereby rotating the crank shaft by the spring force of the second power spring so as to start the engine. In the case where the spring force is accumulated in the second power spring, the power spring is only rotated, and any load from the engine is not applied. Accordingly, the small pulling force of the recoil rope is sufficient, even the weak person can easily execute the pulling operation of the recoil rope and it is possible to securely start the engine at a necessary time.

Further, the engine starting device in the patent document 2 mentioned above is provided with a power spring force accumulating mechanism, a manual rope reel accumulating a rotating force in the power spring force accumulating mechanism, a reset lever having a stopper inhibiting a rotation in an output side of the power spring force accumulating mechanism and holding the accumulated rotating force to a predetermined torque, and a transmission mechanism transmitting the accumulated rotating force to a crank shaft of an internal combustion engine at a time when the stopper is cancelled. In this case, the reset lever can be manually switched from a stop position to a free position, and can automatically start the engine on the basis of the same operation as the patent document 1 mentioned above. In other words, in accordance with the engine starting device, the stopper exists at the stop position in a steady state until the reset lever is set to the free position, thereby inhibiting the rotation in the output side of the power spring force accumulating mechanism. In this state, a sufficient accumulated force for starting the engine is stored in the power spring force accumulating mechanism by pulling the recoil rope at several times, and if the sufficient accumulated force is stored, the reset lever is automatically moved to the free position so as to start the engine at the same time. Therefore, even the weak person can easily operate the engine.

Both the patent documents 1 and 2 disclose the structure in which the force is accumulated in the power spring force accumulating mechanism by rotating the coil drum (the rope reel) on the basis of the pulling operation of the recoil rope. However, the structure, for example, disclosed in Japanese Patent No. 2573340 (patent document 3) accumulates force by rotating a power spring barrel drum of the power spring force accumulating mechanism via a ratchet mechanism in one direction on the basis of an electric power of an accumulator battery, cancels an engagement of a ratchet wheel of a rotation driven portion with a starter ratchet pawl at a time when the sufficient accumulated force for starting the engine is stored, and starts the engine by releasing the accumulated force.

Patent Document 1: Japanese Utility Model Application Laid-Open No. 1-91075

Patent Document 2: Japanese Patent Application Laid-Open No. 2001-65435

Patent Document 3: Japanese Patent No. 2573340

DISCLOSURE OF THE INVENTION

Problem to be Solved by the Invention

As mentioned above, each of the patent documents 1 to 3 is configured such that the engine is started via a centrifugal clutch mechanism engaging with the rotation driven portion by winding up the power spring in which one end is supported to the power spring barrel drum and the other end is supported to the rotation driven portion, on the basis of the driving of the rotation drive portion so as to accumulate force, thereafter operating the stopper and the starter ratchet pawl, canceling the lock of the rotation driven portion at an optional timing, and rapidly rotating the rotation drive portion in the accumulated force releasing direction. When the engine gets into the steady rotation, an engaging and disengaging pawl portion of the centrifugal clutch mechanism engaging with the ratchet wheel of the rotation driven portion by the centrifugal force on the basis of the high speed rotation is automatically disengaged from the engaged state with the ratchet wheel of the rotation driven portion, and the rotation of the engine is maintained. At this time, the stopper, the starter ratchet pawl and the ratchet wheel of the rotation driven portion are returned to the engaged state on the basis of an elastic force of a torsion spring or the like, and a ratchet tooth of the ratchet wheel in the rotation driven portion is stopped.

A power source for igniting the engine is turned off at a time when a desired work is finished, and the engine is stopped. At this time, since the timing when the engine is stopped is not fixed, the stop position of the engaging and disengaging pawl of the centrifugal clutch mechanism rotating together with the rotation of the engine is not set to a fixed position as is different from the ratchet wheel of the rotation driven portion. In other words, the stop position of the engaging and disengaging pawl portion of the centrifugal clutch mechanism exists, for example, at a position between the adjacent ratchet teeth of the ratchet wheel of the rotation driven portion, in a state in which the engaging and disengaging pawl portion runs on the peripheral surface of the ratchet tooth, or at a position between the engaging and disengaging pawl portion and a pivot portion of the pawl portion where the engaging and disengaging pawl portion runs on the ratchet tooth. In this case, if the stop position of the engaging and disengaging pawl portion exists between the adjacent ratchet teeth mentioned above, the engaging and disengaging pawl portion is smoothly engaged with the ratchet tooth at the closest position to the rotating direction of the rotation driven portion at a time of restarting the engine. Consequently, no particular problem is generated.

Accordingly, if the lock of the rotation driven portion is detached when the engaging and disengaging pawl portion stops in a state of running on the ratchet tooth or in a state of getting over the ratchet tooth, the accumulated force of the power spring is released and the ratchet tooth is rapidly rotated, the engaging and disengaging pawl portion of the centrifugal clutch mechanism further rises up on the ratchet tooth, the ratchet tooth to be engaged under the posture comes into collision with the engaging and disengaging pawl portion. The collision at this time is not generated between the engaged surfaces of the ratchet tooth and the engaging and disengaging pawl portion, but is generated between a tooth end of the ratchet tooth and a pawl end of the engaging and disengaging pawl portion. The tooth tip and the pawl tip are broken due to an impact at that time, the accumulated force for starting the engine can not be well transmitted to the engine side and the engine start cannot be executed. Further, in the case where, with respect to the accumulated force of the force accumulating power spring, the engagement between the engaging and disengaging lever and the first ratchet is not firmly executed, the accumulated force is released by an unexpected external force, and there is a possibility that the engine start can not be executed at an optional timing.

Means for Solving the Problem

The present invention is made for solving the problem mentioned above, and an object of the present invention is to provide an engine starting device and a power transmission mechanism between an engine and a lever which can avoid a breakage due to a collision between a pawl tip of an engaging and disengaging pawl portion of a centrifugal clutch mechanism coupling a rotation driven portion and the engine at a time of starting the engine, and a tooth tip of a ratchet tooth of the rotation driven portion engaging with the engaging and disengaging pawl portion.

The above object is effectively achieved by, as the basic configuration of the present invention, a power transmission mechanism between an engine starting device and an engine in which a damping and force accumulating means is interposed in a power transmission system between a rotation drive portion and a rotation driven portion, a power of the drive portion is accumulated between the damping and force accumulating means and the rotation driven portion, the accumulated force is released by canceling a lock of the rotation driven portion at a desired time, and the engine is started via an automatic connecting and disconnecting means arranged between the rotation driven portion and the engine, wherein the damping and force accumulating means has a power spring barrel drum and a power spring having one end supported to the barrel drum, and the rotation driven portion supports the other end of the power spring and is provided with an engaging and disengaging lever engaging and disengaging in accordance with an external operation so as to lock a rotation in one direction of the rotation driven portion, a first ratchet portion having a plurality of ratchet teeth engaging with and disengaging from the engaging and disengaging lever, and a second ratchet portion having a plurality of ratchet teeth engaging with and disengaging from the automatic connecting and disconnecting means, the automatic connecting and disconnecting means is pivotally supported to a member working with an engine rotation such as a fan, a crank shaft or the like of the engine in a pivotally attached portion, has an engaging and disengaging pawl portion in a leading end, has a lever-shaped engaging and disengaging member energized in such a direction that the engaging and disengaging pawl portion engages with the second ratchet portion, and is provided with a centrifugal clutch function that when the crank shaft of the engine reaches a desired rotating speed, the lever-shaped engaging and disengaging member rotates against the energization on the basis of a centrifugal force, and the engagement between the engaging and disengaging pawl portion and the ratchet tooth of the second ratchet portion is automatically disconnected, and a side surface in a side facing to the ratchet tooth of the second ratchet portion of the lever-shaped engaging and disengaging member has a shape concaved in a direction away from a peripheral surface of the second ratchet portion from the pivotally attached portion over the engaging and disengaging pawl portion.

It is desired that the engaging and disengaging pawl portion formed in the leading end portion of the lever-shaped engaging and disengaging member and the ratchet tooth of the second ratchet portion are engaged by a surface contact. Preferably, the ratchet tooth of the first ratchet portion and the ratchet tooth of the second ratchet portion are arranged at a predetermined phase difference. In addition, preferably, the engaging and disengaging lever and the first ratchet portion are made of a metal material, and an engaging and disengaging surface of the ratchet tooth of the first ratchet portion with the engaging and disengaging lever has an angle of slope smaller than 90 degree between the engaging and disengaging surface and the peripheral surface of the ratchet main body. Further, a surface hardness of the engaging and disengaging lever may be set lower than a surface hardness of the ratchet tooth of the first ratchet portion. Desirably, the engaging and disengaging lever is obtained in accordance with a press molding of a sheet metal, is entirely formed in an L shape, and is bent at 90 degree in one end so as to form the engaging and disengaging pawl. More preferably, the lever-shaped engaging and disengaging member having the centrifugal clutch function is arranged in a point symmetrical manner with respect to a center of rotation of the crank shaft.

Effect of the Invention

The shape of the lever-shaped engaging and disengaging portion of the centrifugal clutch mechanism is formed by concaving a side surface facing to the ratchet tooth of the second ratchet portion in a direction away from the ratchet tooth from the pivot portion to the engaging and disengaging pawl portion in the tip end. Accordingly, even if the engaging and disengaging pawl portion is stopped in the state of running on the ratchet tooth or in the state of getting over the ratchet tooth, at a time of starting the engine, the engagement surface of the engaging and disengaging pawl portion is changed to the posture looking into the engagement surface of the ratchet tooth in accordance with the rotation of the ratchet tooth, and the concave portion of the lever-shaped engaging and disengaging member thereafter strides over the ratchet. In order to brace the ratchet tooth to be engaged in the posture, the engagement surfaces of the ratchet tooth and the engaging and disengaging pawl portion are brought into contact with each other. As mentioned above, the engagement surface of the engaging and disengaging pawl portion securely faces to the engagement surface of the ratchet tooth just before the engagement. For this reason, a surface engagement is achieved, and a local collision between the pawl tip and the tooth tip is avoided, so that the pawl tip and the tooth tip are not broken. Since the engagement at this time is achieved by the surface engagement, an impact force at a time of engaging is not concentrated to one point, and it is possible to do away with the deformation of the engaging and disengaging pawl portion and the ratchet tooth.

In general, the power spring barrel drum is supported to a main shaft via a bearing type one-way clutch so as to only allow the rotation of the power spring in the force accumulating direction, or a ratchet mechanism is used. The bearing type one-way clutch and the ratchet mechanism mentioned above are basically provided for accumulating the force in the power spring accommodated in the inner portion of the power spring barrel drum. On the other hand, there have been conventionally an engine starting device of a type excluding the bearing type one-way clutch and the ratchet mechanism, directly transmitting the drive of the rotation drive portion to the rotation driven portion via the barrel drum and the power spring and automatically starting the engine at a time when the power is accumulated in the power spring over the maximum load of the engine. In accordance with the engine starting device of this type, the engine can be started at a stroke, for example, in the case of starting the engine on the basis of the pulling operation of the recoil rope. For this reason, this engine starting device is favorite of those skilled in the art or the like.

The present invention is configured such that in addition to the matter that it is possible to release the accumulated force of the power spring so as to start the engine by operating the engaging and disengaging lever from the external portion as mentioned above so as to detach the engagement between the first ratchet portion of the rotation driven portion and the engaging and disengaging lever, it is possible to directly transmit the accumulated force stored in the power spring to the rotation driven portion so as to start the engine. Accordingly, the configuration is made such that a third ratchet portion is formed in the power spring barrel drum, and the engagement between the second engaging and disengaging lever and the power spring barrel drum is detached by actuating the engaging and disengaging lever in accordance with the external operation approximately the same time of detaching the engagement with the first rotation ratchet portion. As mentioned above, when switching to the type directly transmitting the drive of the rotation drive portion to the rotation drive portion via power spring barrel drum and the power spring, the power spring barrel drum is rotated while accumulating the force in the power spring on the basis of the drive of the rotation drive portion, and a part of the accumulated force of the power spring is released so as to slowly rotate the first ratchet portion of the rotation driven portion concurrently, wherever the engaging and disengaging pawl portion of the centrifugal clutch mechanism stops at a time of the preceding engine stop. Consequently, the ratchet tooth is brought into contact with the engaging end disengaging pawl portion of the centrifugal clutch mechanism on the small impact force at a time of the rotation so as to be engaged. Accordingly, when switching to this type, the pawl tip and the tooth tip are not broken.

In this case, when the engine stops, the stop position of the first ratchet portion of the rotation drive portion is not necessarily constant in addition to the stop position of the engaging and disengaging pawl portion as mentioned above. Accordingly, in the case where the engine is started by engaging the engaging and disengaging lever with the ratchet tooth of the first ratchet portion, and detaching the engaging and disengaging lever after accumulating a desired accumulated force in the force accumulating power spring, the first ratchet portion is slightly rotated in the accumulated force releasing direction via the power spring if the power spring barrel drum is rotated in the force accumulating direction. On the other hand, as mentioned above, the stop position of the engaging and disengaging pawl portion in the engine side is not constant at a time of the engine stop.

When the engine is started by detaching the engagement between the engaging and disengaging lever and the first ratchet portion as mentioned above after accumulating the force in the force accumulating power spring, there is a high probability that the first ratchet portion is rotated even slightly as mentioned above. Accordingly, if the ratchet teeth of the first ratchet portion and the second ratchet portion are arranged at a predetermined phase difference, the ratchet tooth of the second ratchet portion rotating in accordance with the rotation of the first ratchet portion previously gets close to the engaging and disengaging pawl portion in the engine side away from the ratchet tooth. Then, a distance of engagement between the first ratchet portion and the engaging end disengaging pawl portion corresponding to a part of the centrifugal clutch mechanism becomes shorter at a time of starting the engine, and a kinetic energy until both the elements are engaged becomes smaller.

In addition, since an angle of slope is applied to the ratchet tooth of the first ratchet portion, a wedge effect is generated in the engagement between the engaging and disengaging lever and the first ratchet portion, and it is possible to firmly engage. Further, in the case where the engaging and disengaging lever is formed by an L-shaped sheet metal, and an engaging pawl is formed by bending a leading end portion thereof perpendicularly, it is possible to make an engaging width in a crank axial direction of the engagement portion larger on the basis of the length of the bent portion, and it is possible to allow the motion in the crank axial direction to some extent in the engagement portion between the first ratchet portion and the engaging and disengaging pawl portion. Accordingly, it is possible to prevent the engagement from being cancelled by the small external force.

Further, since the engaging and disengaging lever and the first ratchet portion are made of the metal, and a hardness of the engaging and disengaging lever is made lower than a hardness of the first ratchet portion, the engaging and disengaging lever is worn due to a repeated use. However, the motion in the crank axial direction is controlled even if the engaging and disengaging lever is worn, so that the engagement with the first ratchet portion becomes further firm.

In the case where the lever-like engaging and disengaging member having the centrifugal clutch function is arranged in a point symmetrical manner with respect to the center of rotation of the crank shaft, a pair of the lever-like engaging and disengaging members are simultaneously engaged with two ratchet teeth of the rotation driven portion at the phase difference of 180 degree. Accordingly, it is possible to securely transmit the drive force to the engine.

DESCRIPTION OF REFERENCE NUMERALS

Figure 1:
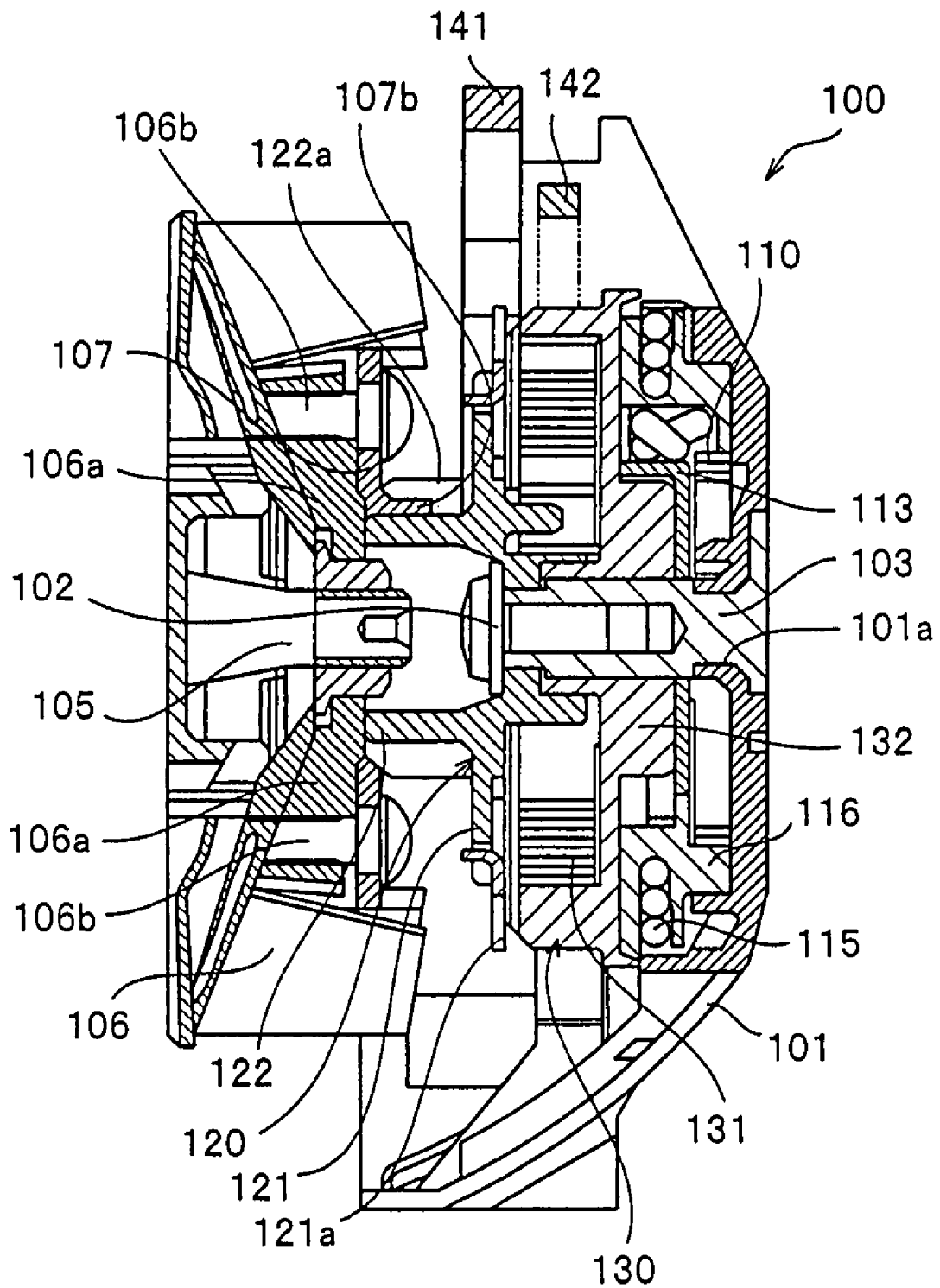
FIG. 1 is a vertical cross sectional view showing an example of an assembly structure of an engine starting device in accordance with a typical embodiment of the present invention and a compact engine.

100 engine starting device
101 half case body
101a cylindrical boss portion
102 locking screw
103 main shaft
105 crank shaft
106 fan
106a pivot portion
106b locking screw
107 lever-shaped engaging and disengaging member
107a lever-shaped engaging and disengaging portion main body
107b engaging and disengaging pawl portion
107c tail portion
107d pivot portion
107e concave surface
110 recoiling power spring
110a outer hook end
112 circular hole
113 power spring case
114 grip
115 recoil rope
116 recoiling reel
116a engaging and disengaging pawl lever
117 lever-shaped engaging and disengaging member
117a lever-shaped engaging and disengaging portion main body
117b engaging and disengaging pawl portion
120 ratchet wheel
121, 122 first and second ratchet portions
121a, 122a ratchet tooth
123 cylindrical protruding portion
123a (U-shaped) notch groove
123b (inverted-J-shaped) notch groove 130 barrel drum
130a power spring accommodating portion
130b protruding portion
130b-1 engagement surface
130b-2 top portion
130b-3 slope surface
130c outer peripheral ratchet tooth
131 force accumulating power spring
131a outer hook portion
131b inner hook portion
132 small ratchet portion.
132a ratchet tooth
133 annular cover
141, 142 first and second engaging and disengaging levers
141a, 142a engaging pawl lever portion
141a, 142a operating portion
143 slide switch
143a operation piece
143b slide piece
143c link piece
144, 145 torsion spring
D rotation drive portion
M rotation driven portion
O, O' center
α angle of slope of ratchet tooth

BEST MODE FOR CARRYING OUT THE INVENTION

A description will be given below of a preferable embodiment of an engine starting device in accordance with the present invention with reference to the accompanying drawings. In this case, in the present embodiment, there is exemplified a power transmission mechanism between a starting device of a small-sized air-cooled internal combustion engine applied to a chain saw and the engine. However, it goes without saying that the structure can be applied to a lawn mower, a rotary saw or the like on which the same kind of engine starting device and engine are mounted.

Figure 2:
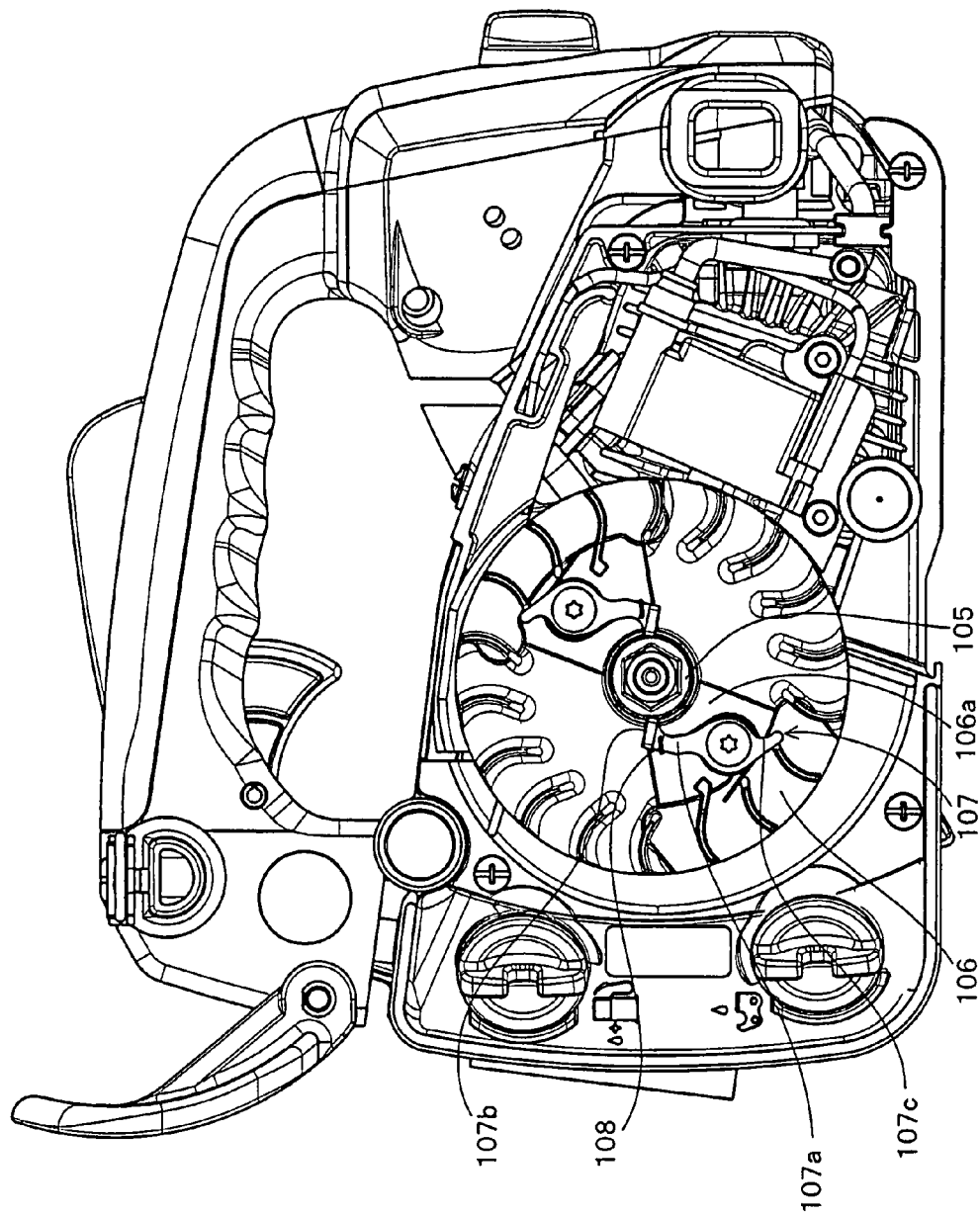
FIG. 2 is a back elevational view as seen from an engine start side showing an example of a layout of constituting members of the engine.

FIG. 1 is a vertical cross sectional layout view showing an assembly structure between an engine starting device in accordance with the present embodiment and a crank shaft of an engine, and FIG. 2 is a back elevational view in the case of viewing the engine from the engine starting device side.

As shown in FIGS. 1 and 2, a fan 106 is fixedly provided in a crank shaft 105 of an engine (not shown), and a pivot portion 106a rotatably pivoting a lever-shaped engaging and disengaging member 107 corresponding to one constituting member of a centrifugal clutch mechanism mentioned below is integrally formed in a back face in an engine starting device side of the fan 106 while pinching the crank shaft 105 therebetween. A pair of the pivot portions 106a are arranged at a phase difference of 180 degrees while pinching the crank shaft 105 therebetween as shown in FIG. 2, and a shape thereof is formed in a fan shape as seen from the engine starting device side. The lever-shaped engaging and disengaging member 107 is rotatably pivoted to the pivot portions 106a. The lever-shaped engaging and disengaging member 107 is formed in such a shape that an engaging and disengaging pawl portion 107b bent perpendicularly rises up on one end of a lever-shaped engaging and disengaging portion main body 107a as seen from the side view. A screw insertion hole inserting a locking screw 106b screwed into the pivot portion 106a therethrough is formed in a center portion as seen from a plan view. The lever-shaped engaging and disengaging member 107 has a tail portion 107c extending at a desired angle to an opposite side to the engaging and disengaging pawl portion 107b from the screw insertion hole and having a narrow shaped leading end, as shown in FIG. 1. A torsion spring is interposed between the lever-shaped engaging and disengaging member 107 and the fan 106, and an elastic force of the torsion spring energizes the engaging and disengaging pawl portion 107b so as to always press to the crank shaft side.

Figure 3:
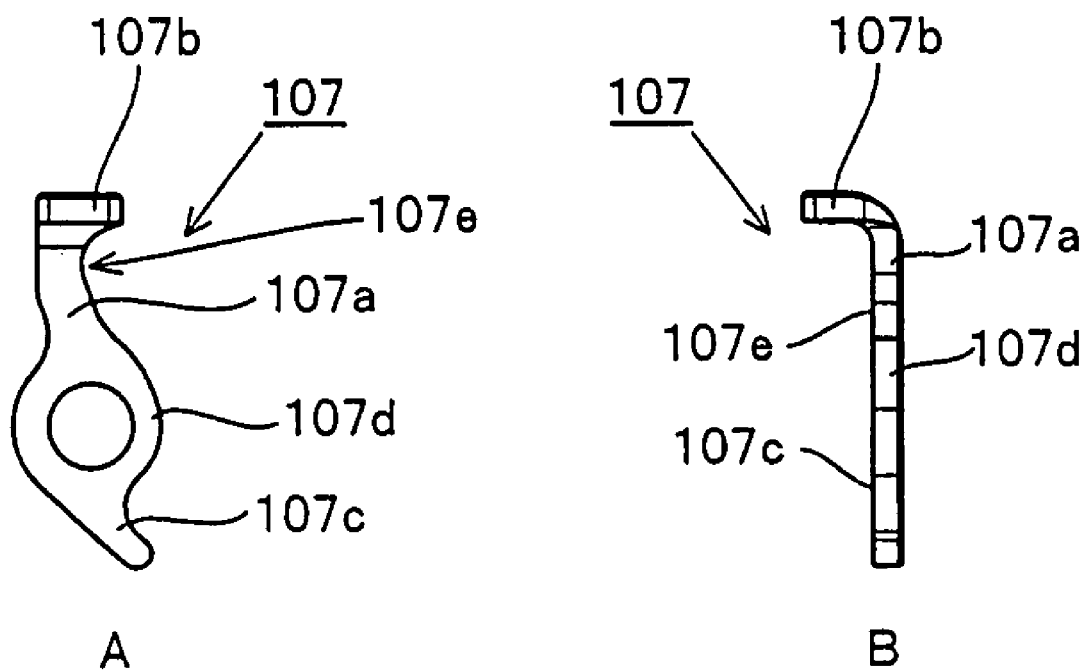
FIG. 3 is an explanatory view of a shape example of a lever-like engaging and disengaging member corresponding to a constituting member of a centrifugal clutch mechanism attached to a fan of the engine.

A plan shape of the lever-shaped engaging and disengaging portion main body 107a constitutes a most important portion of the present invention. FIG. 3 shows an example of a typical entire shape of the lever-shaped engaging and disengaging member 107 in an enlarged manner. As shown in the drawing, a pivot portion 107d between the lever-shaped engaging and disengaging portion main body 107a and the tail portion 107c is formed in a ring shape in which the screw insertion hole is formed as mentioned above. One side surface of the lever-shaped engaging and disengaging portion main body 107a is formed as a concave surface 107e curved in an arch shape so as to be concaved to an inner side. When pivotally attaching the lever-shaped engaging and disengaging member 107 to the pivot portion 106a of the fan 106 via the locking screw 106b, it is attached so as to direct the concave surface 107e to the crank shaft 105. The engaging and disengaging pawl portions 107b of a pair of lever-shaped engaging and disengaging members 107 attached to the fan 106 are engaged with a second ratchet portion 122 of a rotation driven portion M mentioned below of the engine starting device 100.

Figure 4:
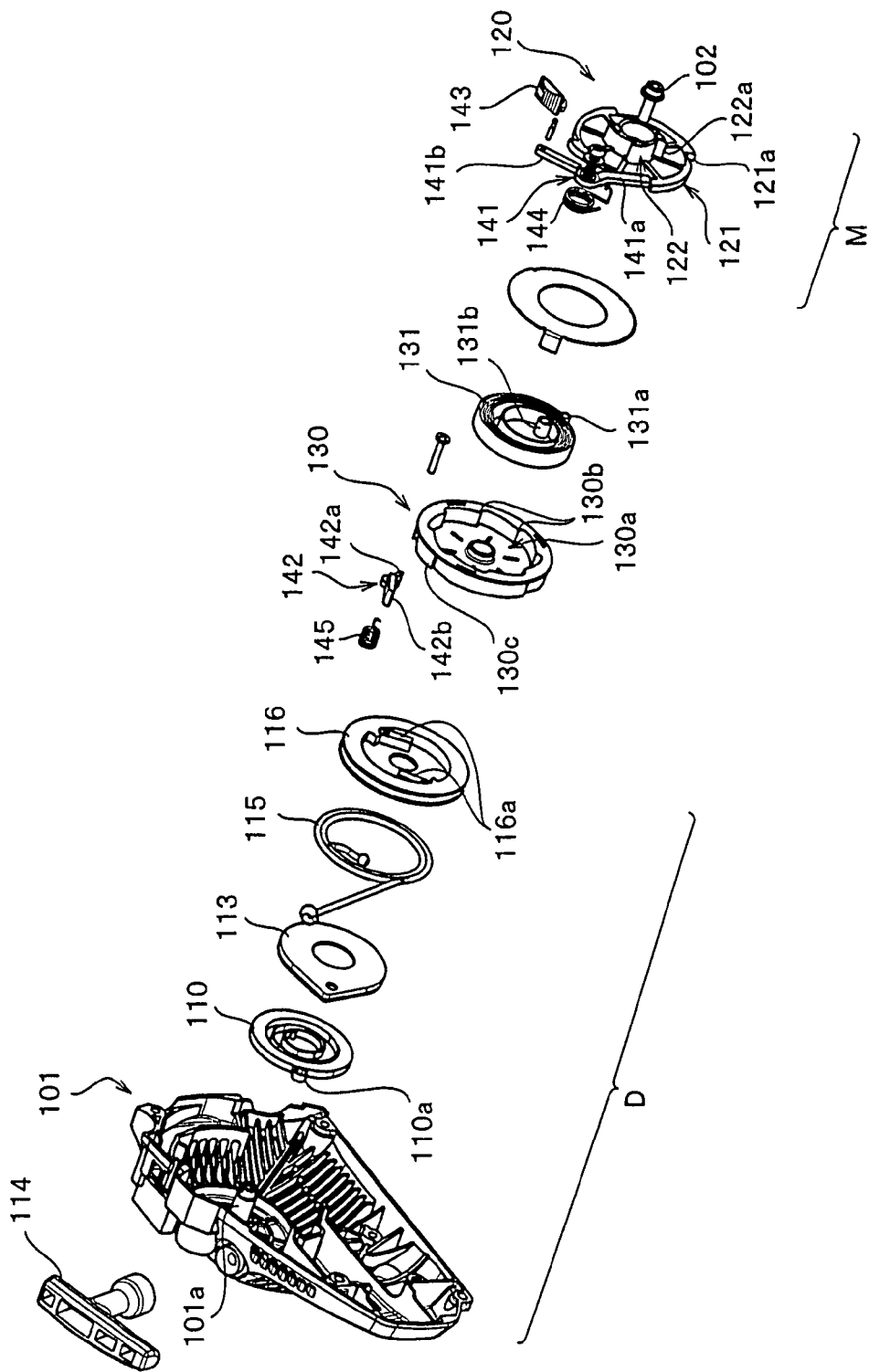
FIG. 4 is an exploded perspective view showing a relation of layout at a time of assembling the constituting member of the engine starting device.

FIG. 4 is an exploded perspective view of a half case body 101 of the engine starting device 100 and an actuating member arranged in an inner portion of the case body 101. A description will be given of a specific example of the engine starting device in the present embodiment with reference to FIGS. 1 and 4.

The engine starting device 100 in the present embodiment is assembled such that a center of rotation of the rotation driven portion M rotatably attached to the main shaft 103 faces to an axial center of the crank shaft 105 in the engine side. The constituting members of the engine starting device 100 are all accommodated in the half case body 101 in the opposite engine side, as shown in FIG. 4. As shown in the drawing, the half case body 101 is provided with a cylindrical boss portion 101a so as to protrude toward the crank shaft side. A base portion of the main shaft 103 is firmly attached to the cylindrical boss portion 101a, and the constituting members of the engine starting device 100 mentioned below are sequentially assembled in the main shaft 103 and are fixed by the locking screw 102.

The engine starting device 100 is provided with a rotation drive portion D and the rotation driven portion M. The rotation drive portion D is provided with a recoiling power spring 110 fixing an outer hook end 110a to an inner surface of the half case body 101 in a contact manner, a power spring case 113 having a circular hole 112 outside fitted to the cylindrical boss portion 101a and formed in a center portion, and brought into contact with the inner surface of the half case body 101 together with the outer hook end 110a so as to be positioned and fixed while accommodating the recoiling power spring 110, a recoil rope 115 having a grip 114 in one end, and a recoiling reel 116 fixing the other end of the recoil rope 115 to a part on a winding peripheral surface so as to wind the recoil rope 115 therearound.

Figure 5:
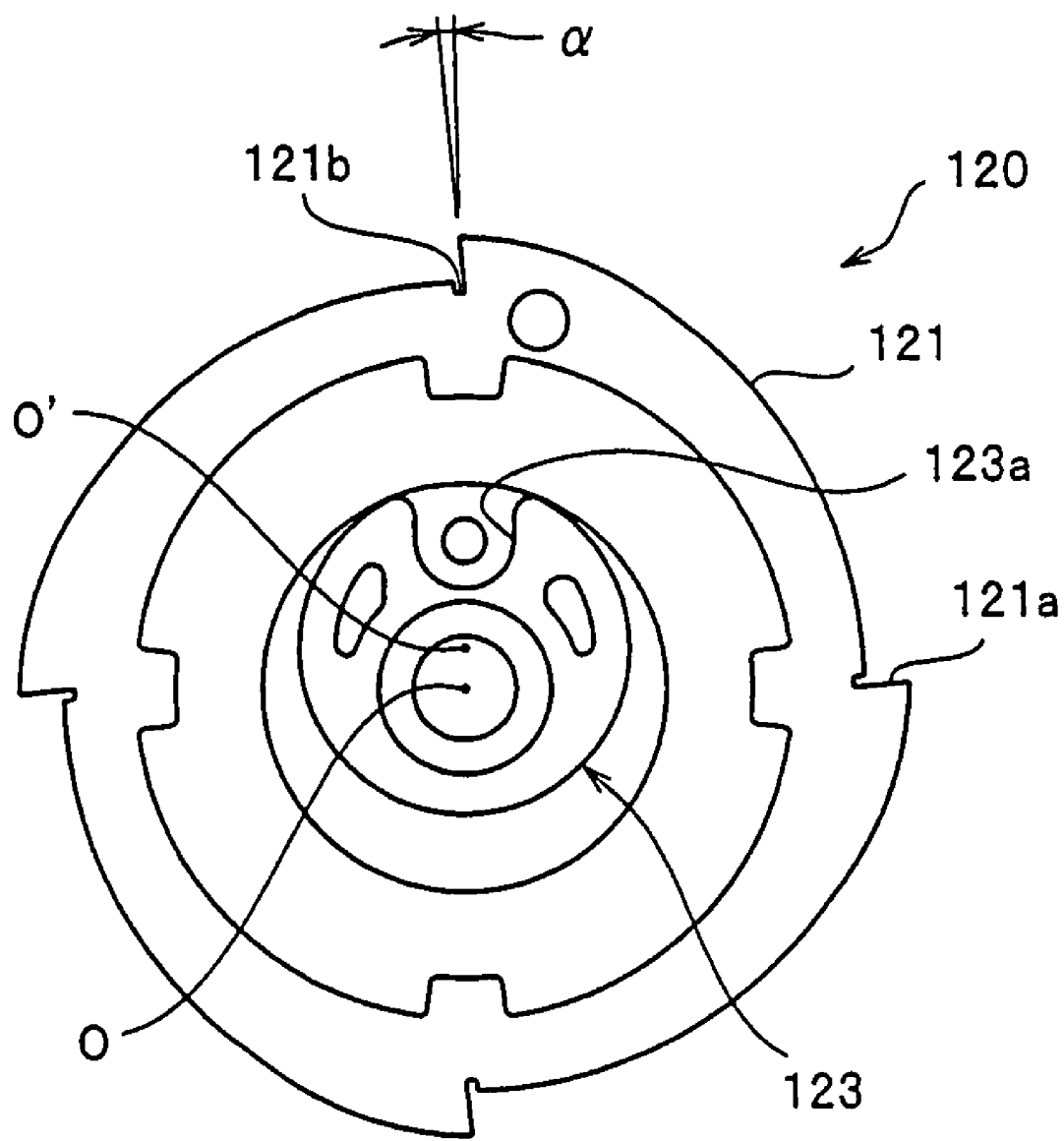
FIG. 5 is a back elevational view of a ratchet wheel in a rotation driven portion of the engine starting device.
Figure 6:
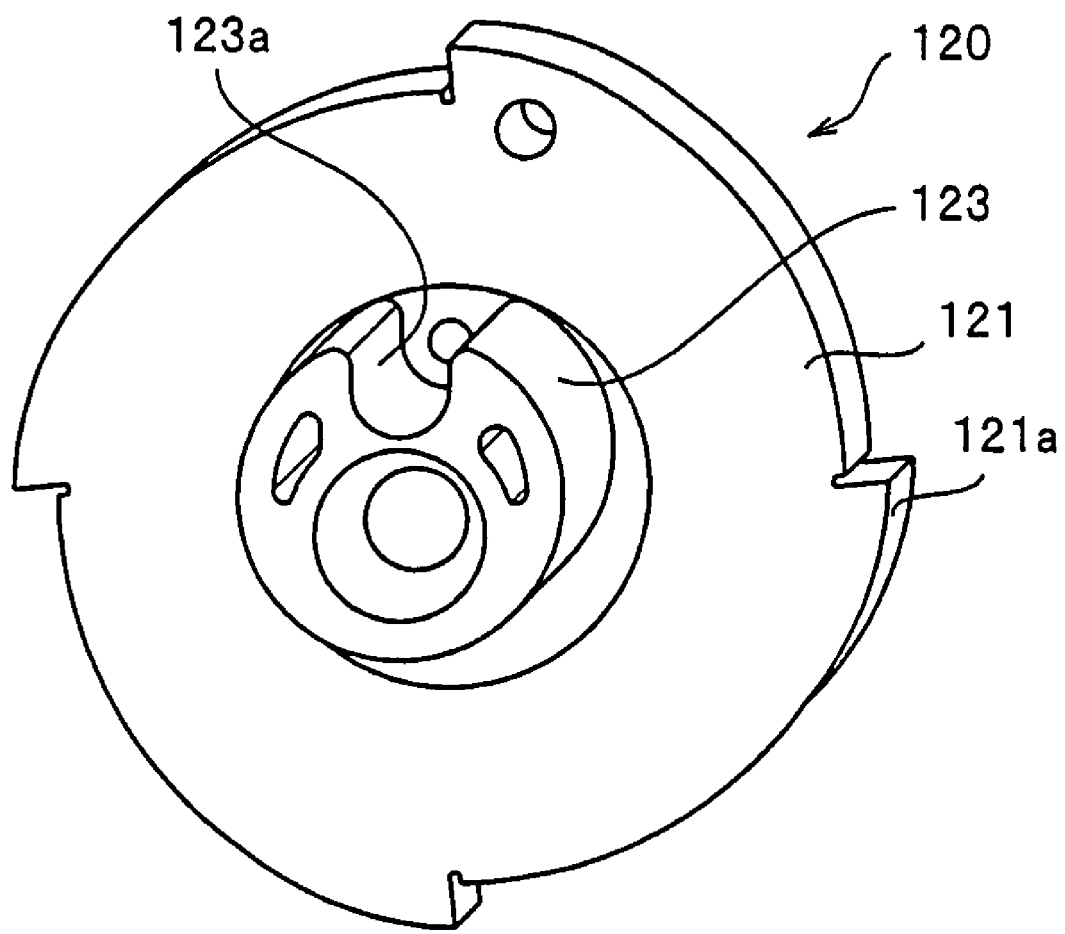
FIG. 6 is a perspective view in the case of viewing the ratchet wheel from a back face side.
Figure 7:
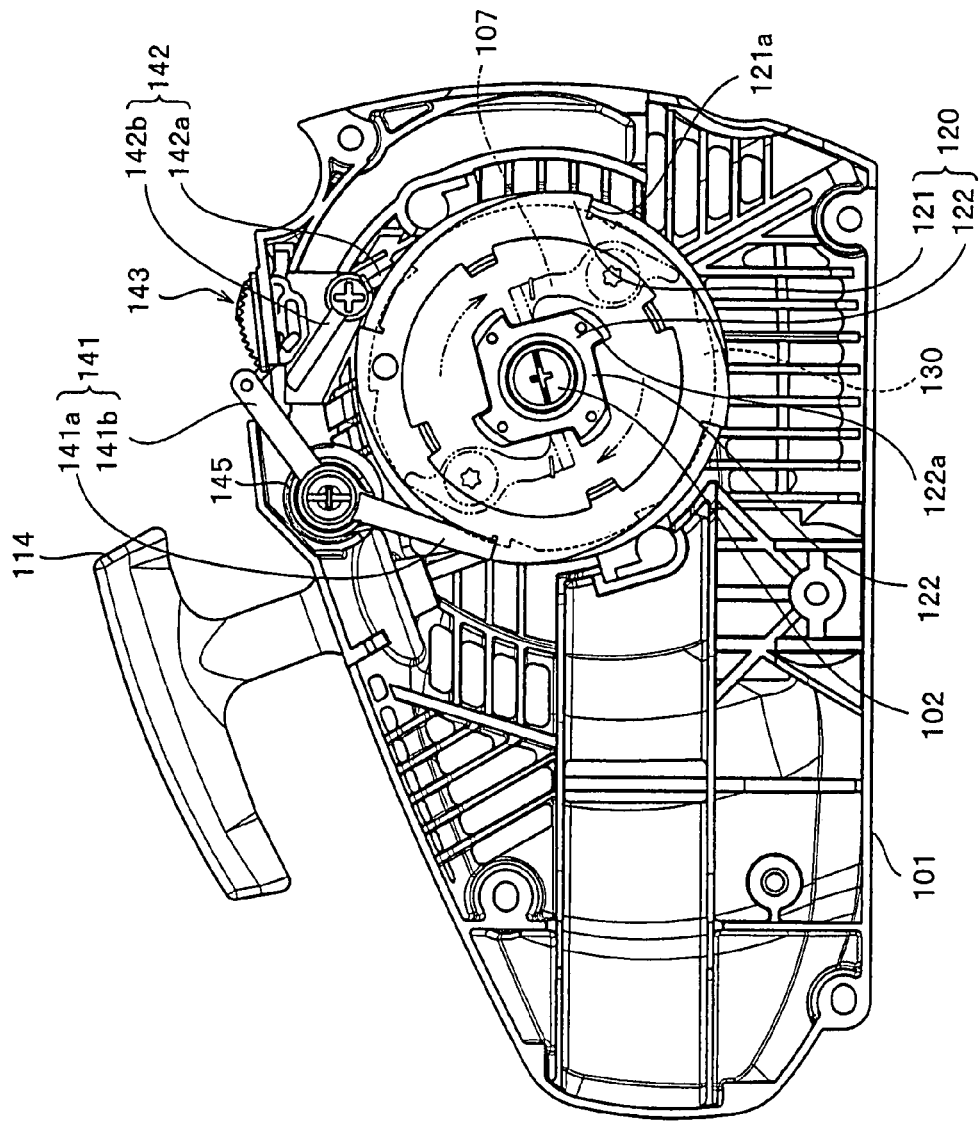
FIG. 7 is a front elevational view as seen from the engine side showing an example of a stop position of the lever-like engaging and disengaging member at a time of engaging the ratchet wheel and the first engaging and disengaging lever.
Figure 8:
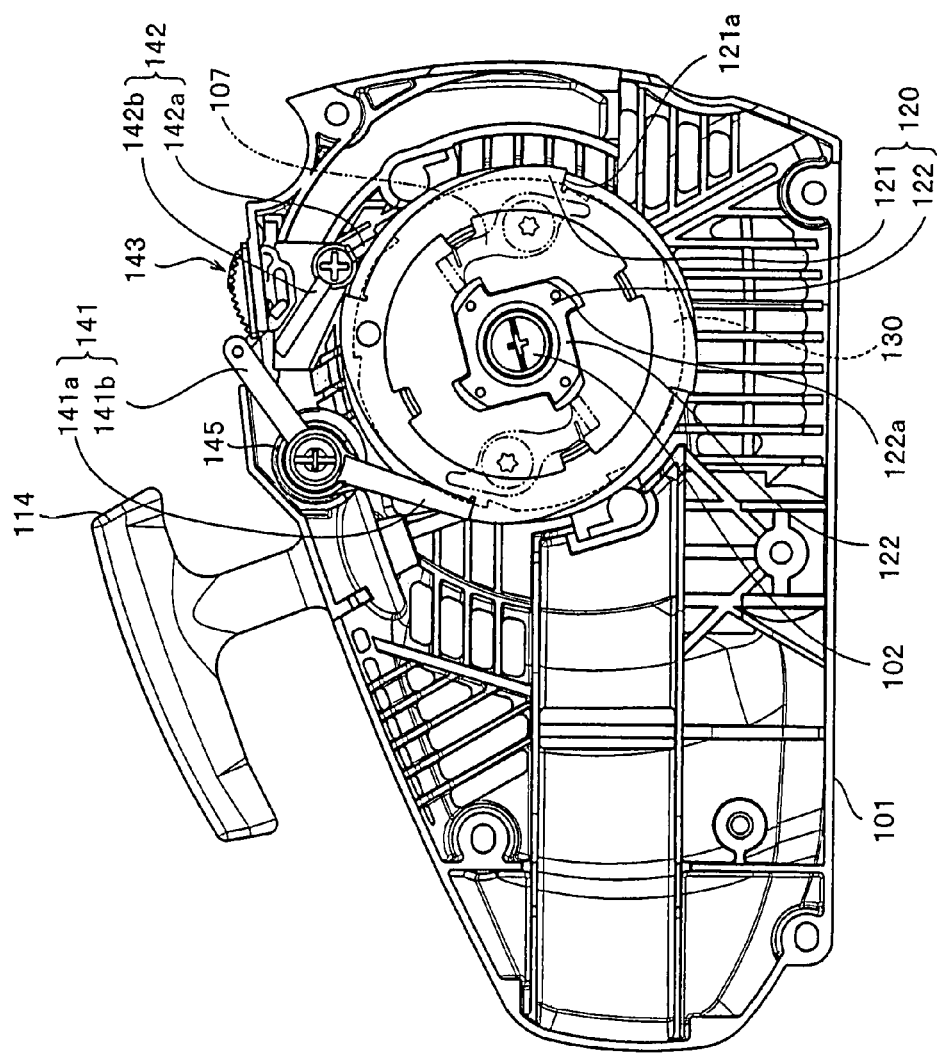
FIG. 8 is a front elevational view as seen from the engine side showing the other example of the stop position of the lever-like engaging and disengaging member at a time of engaging the ratchet wheel and the first engaging and disengaging lever.

The one rotation driven portion M is provided with a ratchet wheel 120 in which first and second ratchet portions 121 and 122 having different diameters are integrally arranged on the same axis, as shown in FIGS. 1 and 4. A center portion of a back face in the rotation drive portion D side of the ratchet wheel 120 is provided, as shown in FIGS. 5 and 6, with a circular protruding portion 123 in which a position deviated from the rotation center O of the ratchet wheel 120 is set to a center O', in a protruding manner, and a U-shaped notch groove 123a leaving for the center O' is formed in a part of a peripheral edge portion of the circular protruding portion 123. A second engaging and disengaging lever 142 mentioned below of the present invention is engaged with and disengaged from a ratchet tooth 121a of the large-diameter first ratchet portion 121, as shown in FIGS. 7 and 8, and the engaging and disengaging pawl portion 107b corresponding to the constituting member of the centrifugal clutch mechanism attached to the crank shaft 105 is engaged with and disengaged from a ratchet tooth 122a of the small-diameter second ratchet portion 122, as shown in FIG. 7. In accordance with the illustrated example, the first ratchet portion 121 and the second ratchet portion 122 have four ratchet teeth 121a and 122a, and both the ratchet portions 121 and 122 have engagement surfaces in an opposite side to a direction allowing the rotation, for allowing only the rotation in the same direction. Since the small-diameter second ratchet portion 122 is engaged with the engaging and disengaging pawl portion 107b as shown in FIG. 1, the small-diameter second ratchet portion 122 is set to a state in which it stops without rotating while following to a rotation in a force accumulating direction of a barrel drum 130 corresponding to a part of a damping and force accumulating means in the present invention, until the engine is started.

Figure 9:
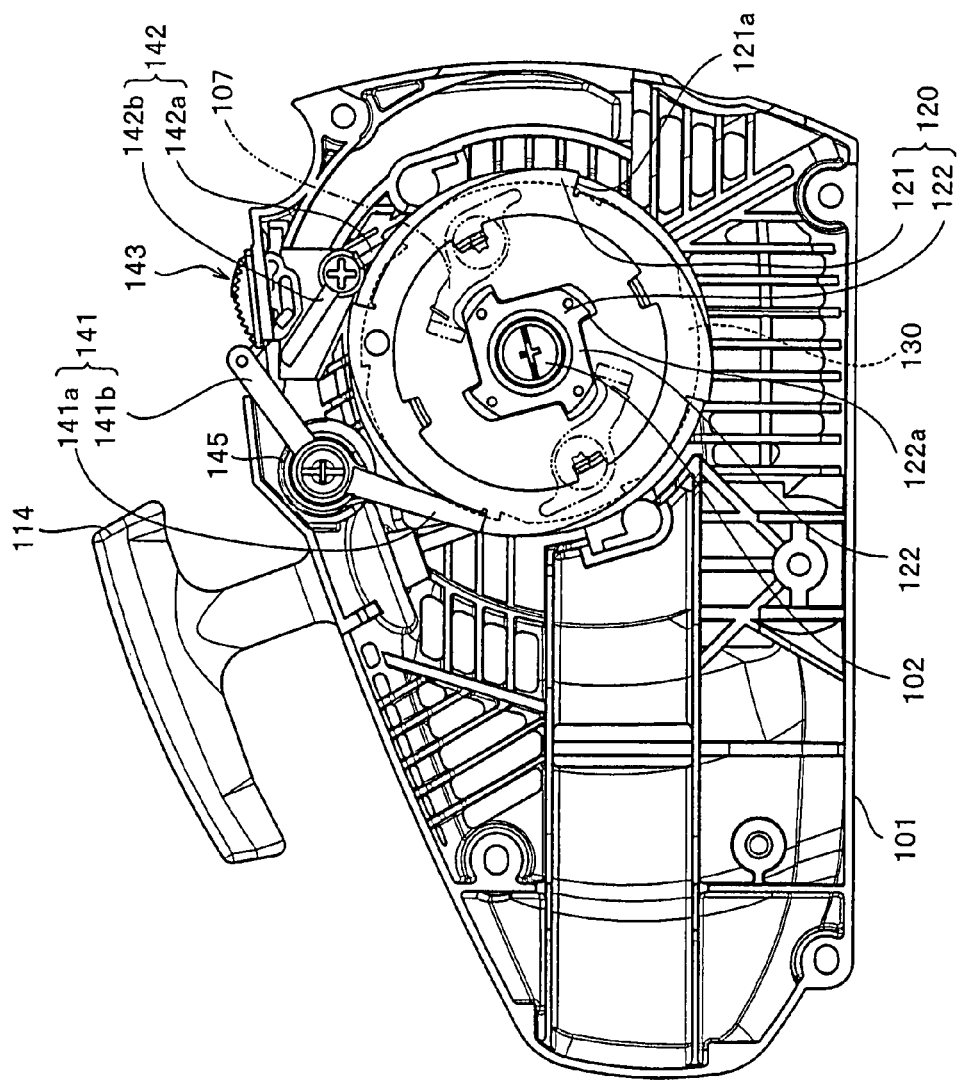
FIG. 9 is a front elevational view as seen from the engine side showing further the other example of the stop position of the lever-like engaging and disengaging member at a time of engaging the ratchet wheel and the first engaging and disengaging lever.
Figure 12:
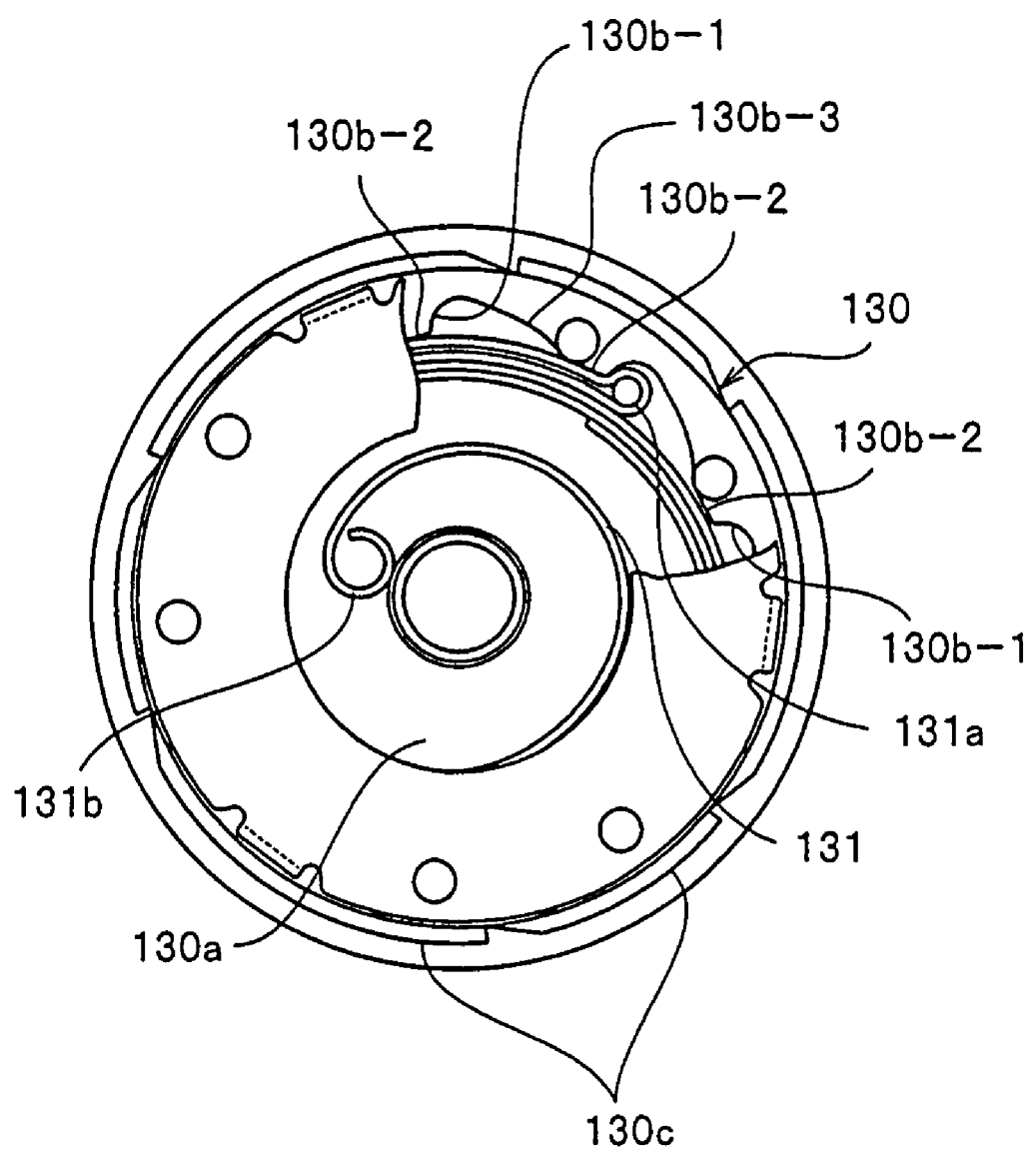
FIG. 12 is a front elevational view as seen from the engine side showing a power spring barrel drum in a damping and force accumulating portion of the engine starting device by being partially cut.
Figure 13:
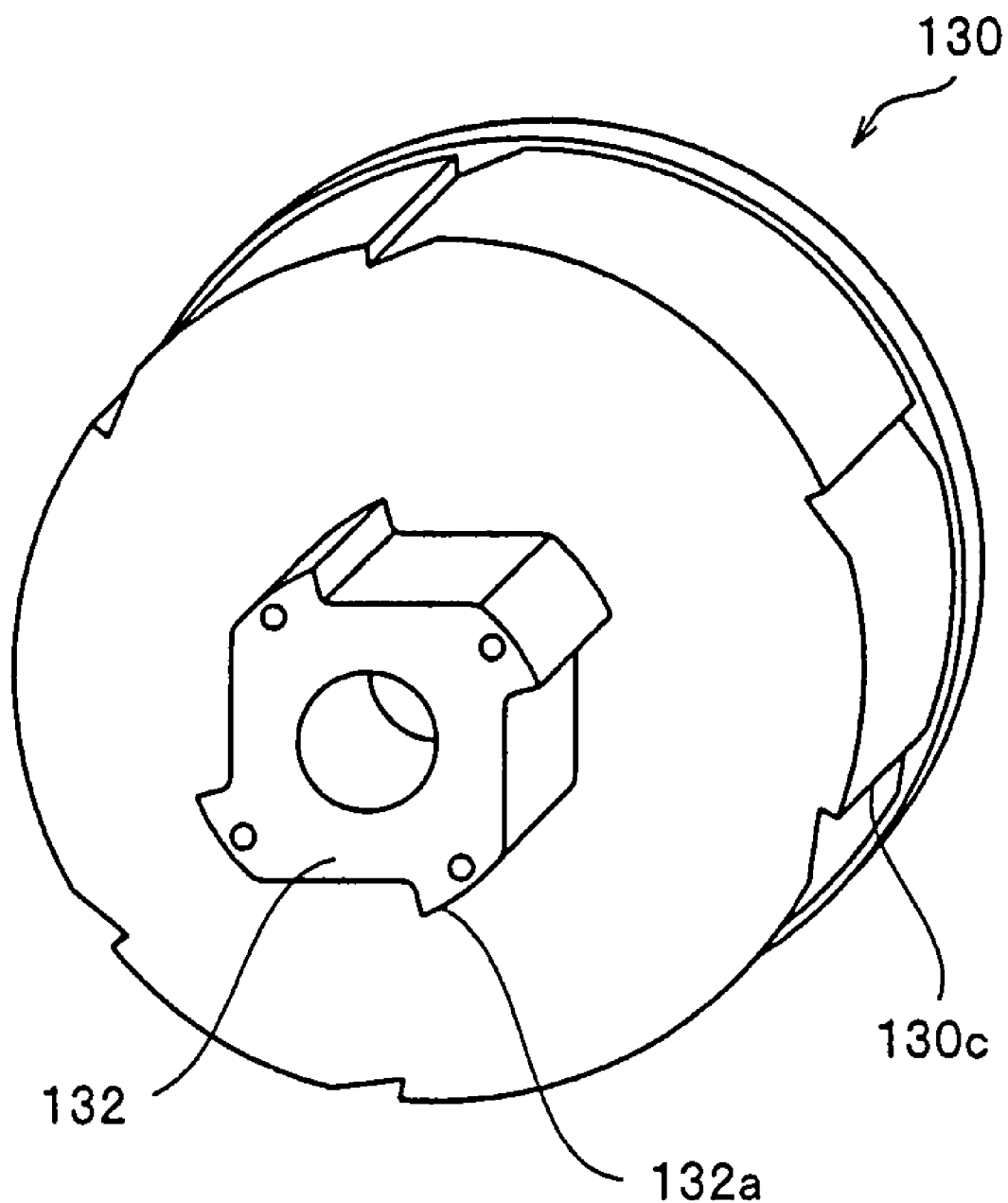
FIG. 13 is a perspective view of the power spring barrel drum as seen from the back face side.

The power spring barrel drum 130 corresponding to the damping and force accumulating means in the present embodiment and a force accumulating power spring 131 accommodated in the barrel drum 130 are interposed between the rotation drive portion D and the rotation driven portion M, as shown in FIGS. 1, 4 and 9. In accordance with the present embodiment, as shown in FIG. 9 in a partly broken enlarged manner, a plurality of protruding portions 130b protrude at a uniform interval from an inner peripheral surface of a power spring accommodating portion 130a of the barrel drum 130. The protruding portions 130b engage with an outer hook portion 131a of the force accumulating power spring 131 and are provided for winding the force accumulating power spring 131 in the force accumulating direction. A shape of the protruding portion 130b is structured, as shown in FIG. 12, such that an engagement surface 130b-1 with which the outer hook portion 131a of the force accumulating power spring 131 is engaged is formed at a time of rotating in the force accumulating direction of the recoiling reel 116, and a slope surface 130b-3 downward inclined smoothly toward an inner peripheral surface of the power spring accommodating portion 130a is formed from a top portion 130b-2 toward an opposite force accumulating direction. On the other hand, the inner hook portion 131b of the force accumulating power spring 131 is fitted and fixed to the U-shaped notch groove 123a formed in the circular protruding portion 123 of the ratchet wheel 120 of the rotation driven portion M. An open surface in the driven portion side of the barrel drum 130 is closed by an annular cover 133, and controls a motion in an axial direction of the force accumulating power spring 131 accumulated in the inner portion.

The protruding portion 130b constitutes a part of a torque limit mechanism. If the accumulated force of the force accumulating power spring 131 reaches a sufficient amount for starting the engine, it is impossible to maintain the engagement with the outer hook portion 131a any more. As a consequence, the engagement with the outer hook portion 131a is detached, the outer hook portion 131a gets over one after another, and it is impossible to accumulate the force any more in the force accumulating power spring 131. It is possible to inform the external portion of the matter that the accumulated force of the force accumulating power spring 131 reaches a limit on the basis of a sound generated at a time when the outer hook portion 131a gets over the protruding portion 130b. In this case, in the present embodiment, the torque limit mechanism is structured between the barrel drum 130 and the force accumulating power spring 131. However, the torque limit mechanism may be provided, for example, in the rotation driven portion M.

Figure 10:
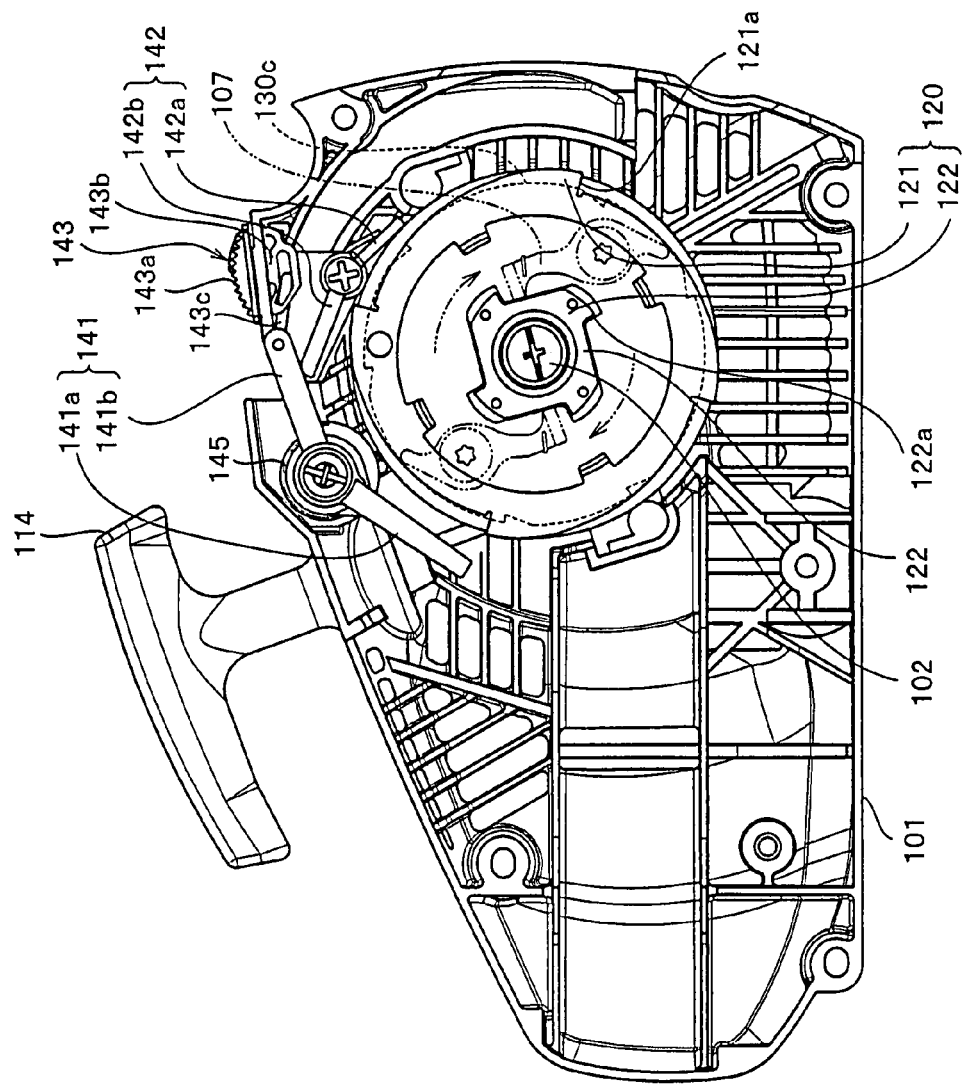
FIG. 10 is a front elevational view as seen from the engine side showing a positional relation between the lever-like engaging and disengaging member and the second ratchet portion at an instant when the engagement between the ratchet wheel and the first engaging and disengaging lever is canceled.
Figure 11:
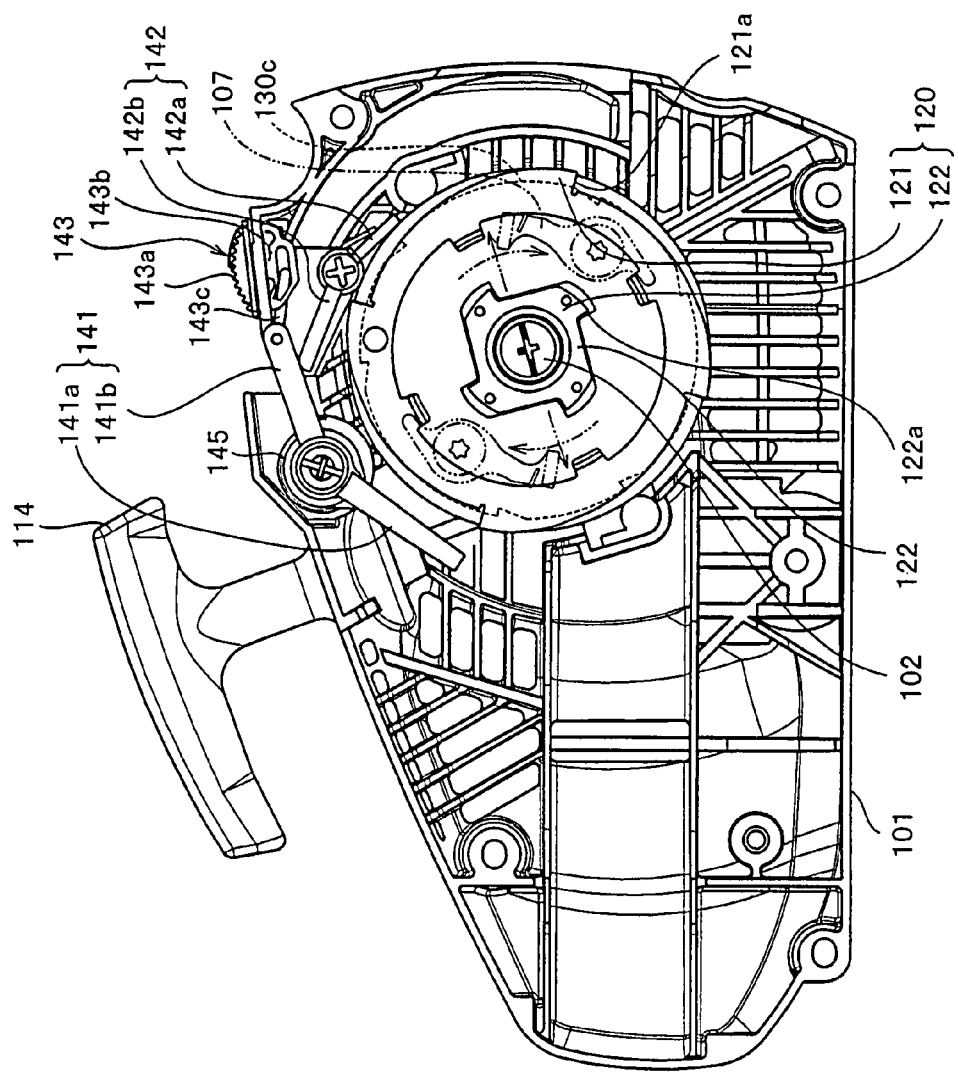
FIG. 11 is a front elevational view as seen from the engine side showing the positional relation between the lever-like engaging and disengaging member and the second ratchet portion at a time when the engine reaches a steady rotation.

A plurality of outer peripheral ratchet teeth 130c are integrally formed in an outer peripheral surface of the barrel drum 130 alternately at a pitch difference. The outer peripheral ratchet teeth 130c serves as a one-way rotating mechanism allowing the rotation in the force accumulating direction (a clockwise direction in FIG. 11) of the force accumulating power spring 131 accommodated in the inner portion as shown in FIG. 11, but inhibiting the inverse rotation. Although a ratchet mechanism is generally employed as the one-way rotating mechanism, it is possible to additionally employ various types of one-way rotating mechanisms, and an installed position is not necessarily limited to the outer peripheral surface of the barrel drum 130. The first engaging and disengaging lever 141 mentioned above is engaged with and disengaged from the outer peripheral ratchet tooth 130c. On the other hand, a small ratchet portion 132 is formed in a center portion of a back face facing to the recoiling reel 116 of the barrel drum 130 as shown in FIG. 10. Further, a facing portion to the small ratchet portion 132 of the recoiling reel 116 is provided, as shown in FIGS. 7 to 9, with an engaging and disengaging pawl lever 116a elastically engaging with and disengaging from a ratchet tooth 132a of the small ratchet portion 132, for rotating the barrel drum 130 only in the force accumulating direction. An engagement surface of the outer peripheral ratchet tooth 130c with the first engaging and disengaging lever 141 is directed toward the force accumulating direction of the force accumulating power spring 131. The engagement surface with the engaging and disengaging pawl lever 116a of the ratchet tooth 132a of the small ratchet portion 132 provided in the back face side of the barrel drum 130 is directed toward the opposite direction to the engagement surface with the ratchet tooth 121a of the first ratchet portion 121 in the ratchet wheel 120 of the rotation driven portion M.

In accordance with the illustrated example, the ratchet tooth 132a of the small ratchet portion 132 is integrally formed in the barrel drum 130 at a phase difference of 90 degree. Two engaging and disengaging pawl levers 116a facing thereto are arranged in the peripheral edge portion in the barrel drum side of the recoiling reel 116 at a phase difference of 180 degree in a point symmetrical manner with respect to the center of rotation of the recoiling reel 116, in which one end is pivoted to a peripheral edge portion of the recoiling reel 116. The engaging and disengaging pawl lever 116a is always energized in a direction of engaging with the ratchet tooth 132a by a torsion spring (not shown). A pair of engaging and disengaging levers 116a are simultaneously engaged with two ratchet teeth 132a arranged at the phase difference of 180 degree among four ratchet teeth 132a, and the recoiling reel 116 and the barrel drum 130 are rotated in the force accumulating direction. However, only the recoiling reel 116 is rotatable in the opposite force accumulating direction.

In this case, in accordance with the present embodiment, under the state in which two engaging and disengaging pawl levers 116a of the recoiling reel 116 are engaged with two ratchet teeth 132a of the small ratchet portion 132 in the barrel drum 130, a sufficient force is accumulated in the force accumulating power spring 131 with respect to the ratchet wheel 120 under the stop state in which the first engaging and disengaging lever 141 is engaged, by pulling the recoil rope 115 so as to rotate the recoiling reel 116 in the force accumulating direction (the clockwise direction in FIG. 5), and rotating the barrel drum in the same force accumulating direction. In this case, if the first engaging and disengaging lever 141 is detached from the ratchet wheel 120, the engine (not shown) is instantaneously started.

In FIGS. 1, 4 and 7, reference numeral 141 denotes the first engaging and disengaging lever engaging with and disengaging from the large-diameter first ratchet portion 121 of the ratchet wheel 120. Reference numeral 142 denotes the second engaging and disengaging lever engaging with and disengaging from the outer peripheral ratchet tooth 130c formed in the outer peripheral surface of the barrel drum 130. Reference numeral 143 denotes a slide switch corresponding to an operating means for executing the engagement and disengagement of the second engaging and disengaging lever 142. In this case, the first engaging and disengaging lever 141 and a link piece 143c mentioned below are made of a metal, and the second engaging and disengaging lever 142 is made of a plastic because the power spring barrel drum 130 is made of the plastic.

Each of the first and second engaging and disengaging levers 141 and 142 is formed in the L shape, and the bent portions thereof are rotatably pivoted to the positions near the upper wall surface of the half case body 101 side by side, as shown in FIGS. 4 and 7. The first engaging and disengaging lever portion 141 is constituted by an engaging pawl lever portion 141a engaging with and disengaging from the large-diameter first ratchet portion 121 of the ratchet wheel 120. An operation portion 141b rotationally operating the engaging pawl lever portion 141a around the bent portion. The engaging pawl lever portion 141a is energized in a direction of engaging with the large-diameter first ratchet portion 121 by a torsion spring 144. On the other hand, the second engaging and disengaging lever 142 is constituted by an engaging pawl lever portion 142a engaging with and disengaging from the outer peripheral ratchet tooth 139c formed in the outer peripheral surface of the power spring barrel drum 130 mentioned above, and an operation portion 142b rotatably operating the engaging pawl lever portion 142a around the bent portion. The engaging pawl lever portion 142a is energized in the direction of engaging with the outer peripheral ratchet tooth 130c of the barrel drum 130 by the torsion spring 145.

Further, in accordance with the present embodiment, the slide switch 143 is attached to the upper surface end portion of the half case body 101 so as to be slidable in a horizontal direction in FIG. 7. The structure of the slide switch 143 has an operation piece 143a in which a lot of concavo-convex surfaces are formed in an upper surface having an upper portion curved upward so as to bulge, and a slide piece 143b fitted and inserted to a slit (not shown) formed in the half case body 101 so as to protrude to a lower side form a lower surface of the operation piece 143a. The slide piece 143b and a leading end portion of the operation portion 142b of the second engaging and disengaging lever 142 are coupled by a link piece 143c. One end of the link piece 143c is attached to a leading end portion of the operation portion 142b of the second engaging and disengaging lever 142 so as to be relatively rotatable, and the other end of the link piece 143c is slidably attached to the slit formed in the slide piece 143b.

Further, the first and second engaging and disengaging levers 141 and 142 are arranged such that in a state in which the second engaging and disengaging lever 142 is disengaged from the large-diameter first ratchet portion 121 of the ratchet wheel 120 via the link piece 143c, the leading end portion of the operation portion 142b of the second engaging and disengaging lever 142 pushes down the leading end portion of the operation portion 141b of the first engaging and disengaging lever 141 from the above, and the engaging pawl lever portion 142a of the second engaging and disengaging lever 142 is disengaged from the outer peripheral ratchet tooth 130c of the barrel drum 130. Further, on the other hand, the first and second engaging and disengaging levers 141 and 142 are removed constraint with the link piece 143c by sliding the slide switch 143 to a left side in FIG. 7 from an upward right side of the half case body 101, and are rotated in the directions respectively engaging with the first ratchet portion 121 of the ratchet wheel 120 and the outer peripheral ratchet tooth 130c of the barrel drum 130 on the basis of the elastic forces of the respective torsion springs 144 and 145.

When sliding the slide switch 143 existing in the right side on the half case body 101 to the left side shown in FIG. 7, the first and second engaging and disengaging levers 141 and 142 are engaged with the outer peripheral ratchet tooth 130c of the power spring barrel drum 130 and the large-diameter first ratchet portion 121 of the ratchet wheel 120 on the basis of an application of the elastic force of the torsion springs 144 and 145. In this state, when rotating the recoiling reel 116 by pulling the recoil rope 115, the power spring barrel drum 130 is rotated in the force accumulating direction. However, since the second engaging and disengaging lever 142 and the outer peripheral ratchet tooth 130c are engaged, the rotation in the opposite direction is stopped. At this time, the ratchet wheel 120 of the rotation driven portion M is exposed to the force in the direction of releasing the spring force of the force accumulating power spring 131. However, since the first engaging and disengaging lever 141 is engaged, the rotation is absolutely stopped. Accordingly, when rotating the recoiling reel 116 by pulling the recoil rope 115, the barrel drum 130 is rotated and only the force accumulation of the force accumulating power spring 131 is executed with respect to the ratchet wheel 120.

In this case, even if the pulling operation of the recoil rope 115 is interrupted and the recoil rope 115 is unclasped, the accumulated force is held between the barrel drum 130 and the ratchet wheel 120 as it is. Consequently, for example, in the pulling operation by the weak person and in the place where the pulling operation of the recoil rope 115 is not freely executed, the engine can be instantaneously started by canceling the engagement between the first and second engaging and disengaging levers 141 and 142 so as to switch to the first start mode, after pulling the recoil rope 115 at several times and storing the sufficient spring force to start the engine in the force accumulating power spring 131. It is possible to securely know on the basis of an informing signal generated by an operation of the torque limit mechanism mentioned above whether or not the accumulated force stored at this time reaches the sufficient force to start the engine.

When sliding the slide switch 143 mentioned above to a right side shown in FIG. 8 after the sufficient force is accumulated in the force accumulating power spring 131, the engagement between the outer peripheral ratchet tooth 130c of the power spring barrel drum 130 and the first ratchet portion 121 of the ratchet wheel 120 is disconnected, so that the first and second engaging and disengaging levers 141 an d142 instantaneously start the engine. If the rotating speed of the engine gets over a predetermined speed, the lever-shaped engaging and disengaging member 107 of the centrifugal clutch mechanism attached to the fan 106 in the engine side is exposed to the centrifugal force. Then, the engagement between the engaging and disengaging pawl portion 107b and the second ratchet portion 122 of the ratchet wheel 120 is disconnected, as shown in FIG. 11, the rotation of the ratchet wheel 120 is automatically stopped, and the engine keeps rotating.

In this case, a manual operating machine mounting the engine having the above configuration thereon turns off an ignition switch without any delay and stops the engine drive after the end or the work. When the engine stops, a stop position of the crank shaft 105 is not fixed, but is changed in a range of 360 degree, and stop positions of a pair of two lever-shaped engaging and disengaging members 107 of the centrifugal clutch mechanism attached to the fan 106 are, of course, changed. On the other hand, a stop position of the ratchet tooth 122a of the second ratchet portion 122 which is rotationally stopped always exists at a fixed position. Accordingly, when the engine stops, the lever-shaped engaging and disengaging member 107 of the centrifugal clutch mechanism having the changed stop position is stopped at various positions, for example, as shown in FIGS. 7 to 10.

Figure 14:
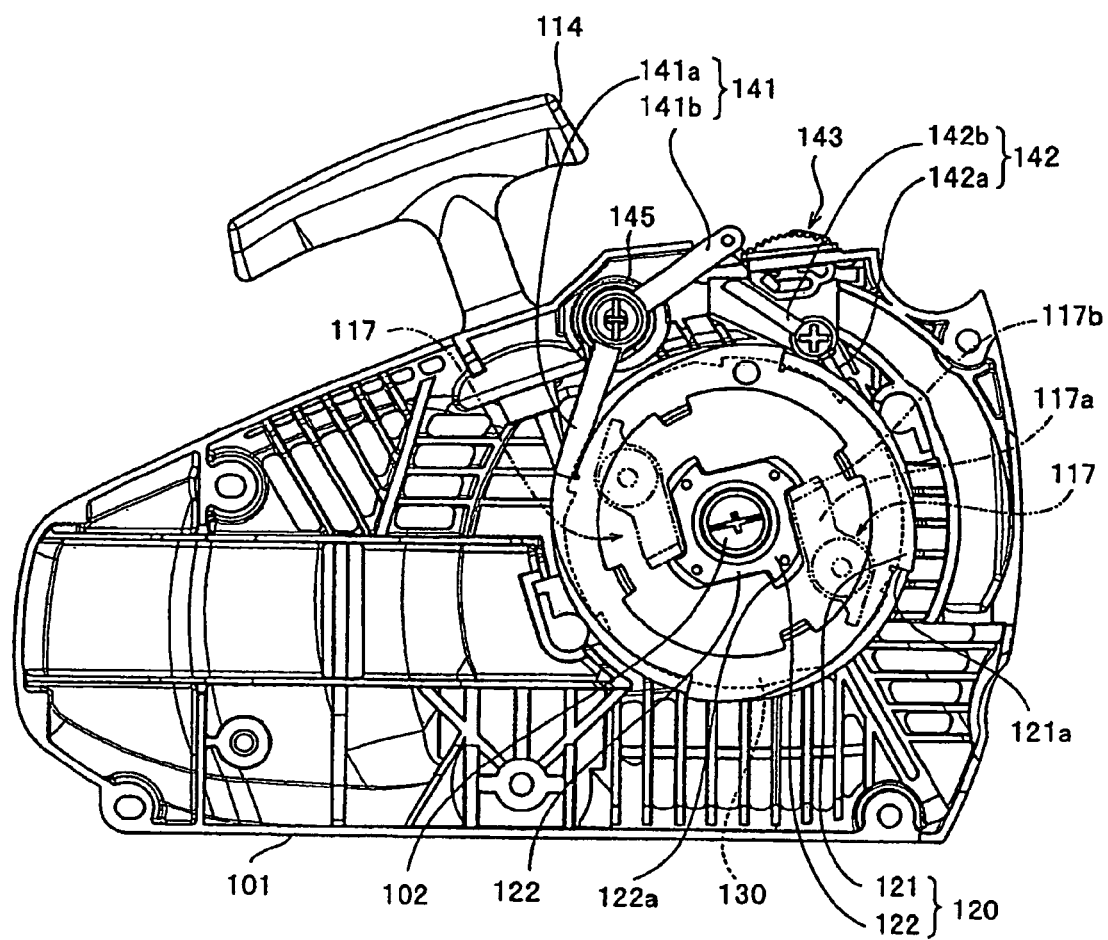
FIG. 14 is a front elevational view as seen from the engine side showing an example of a stop position of the lever-like engaging and disengaging member having a normal shape at a time of engaging the ratchet wheel with the first engaging and disengaging lever.
Figure 15:
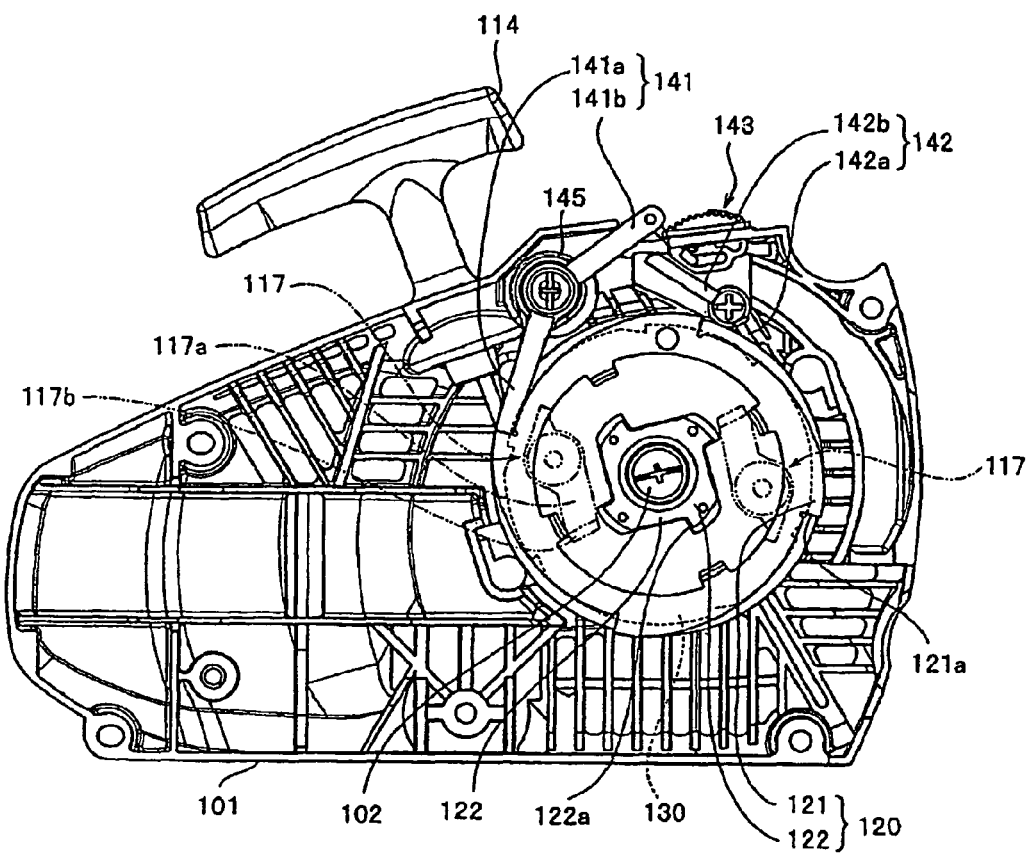
FIG. 15 is a front elevational view as seen from the engine side showing the other example of a stop position of the lever-like engaging and disengaging member having a normal shape at a time of engaging the ratchet wheel with the first engaging and disengaging lever.
Figure 16:
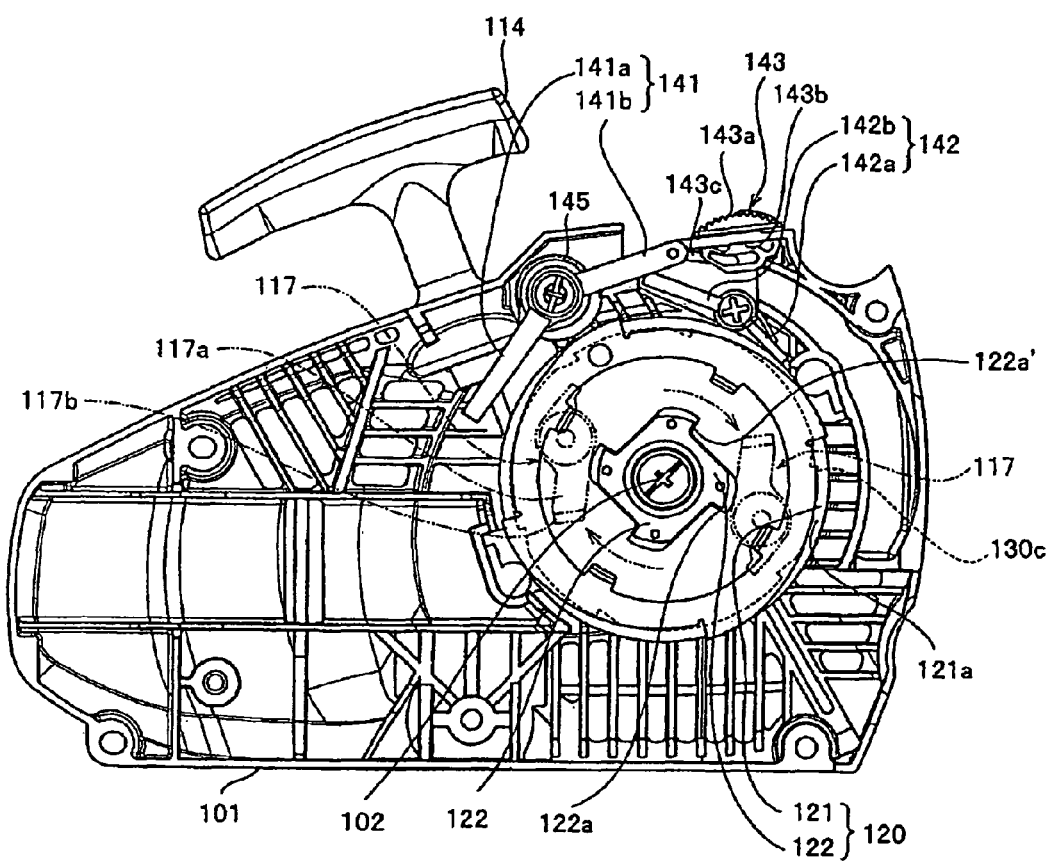
FIG. 16 is a front elevational view as seen from the engine side showing a positional relation between the lever-like engaging and disengaging member and the second ratchet portion after canceling the engagement between the ratchet wheel and the first engaging and disengaging lever.

FIGS. 14 to 16 show examples of three kinds of stop positions of the lever-shaped engaging and disengaging member 117 having a normal shape employed in the centrifugal clutch mechanism attached to the crank shaft 105 at a time of the engine stop. As shown in FIG. 14, in the case where the engaging and disengaging pawl portion 117b of the lever-shaped engaging and disengaging member 117 stops in a state of being brought into contact with the ratchet tooth 122a of the second ratchet portion 122, any particular problem is not generated. On the other hand, the shape of the lever-shaped engaging and disengaging portion main body 117a of the lever-shaped engaging and disengaging member 117 is formed only as a simple strip-shaped plate piece, as shown in these drawings. Assume that the lever-shaped engaging and disengaging member 117 stops at a position shown in FIG. 15. In this case, accumulating the force in the power spring accommodated in the power spring barrel drum 130 by pulling the recoil rope as mentioned above, thereafter sliding the slide switch 143 to the left side in the drawing, and disconnecting the respective engagements between the first and second engaging and disengaging levers 141 and 142, and the first ratchet 121 of the ratchet wheel 120 and the outer peripheral ratchet tooth 130c of the power spring barrel drum 130. As a consequence, the ratchet wheel 120 is rapidly rotated in a direction shown by an arrow in FIG. 16.

At this time, the engaging and disengaging pawl portion 117b of the lever-shaped engaging and disengaging member 117 stops in the state of running on the top position of the ratchet tooth 122a of the second ratchet portion 122. For this reason, an inner side surface of the lever-shaped engaging and disengaging portion main body 117 is pushed up on the basis of the rotation in the clockwise direction of the ratchet wheel 120, the lever-shaped engaging and disengaging member 117 is rotated in the clockwise direction around the center pivot portion, and the engaging and disengaging pawl portion 117b rises up toward the direction away from the ratchet tooth 122a. The engagement surface of the engaging and disengaging pawl portion 117b with the ratchet tooth 122a does not face to the engagement surface of the ratchet tooth 122a' in the next order, but is directed to the other direction. Under this state, the second ratchet portion 122 is rapidly rotated, and when the ratchet tooth 122a' in the next order rapidly comes close, and the ratchet tooth 122a in the previous order passes through the inner side surface corresponding to the center pivot portion of the lever-shaped engaging and disengaging member 117, the engaging and disengaging pawl portion 117b of the lever-shaped engaging and disengaging member 117 moves so as to bow down toward the engagement surface of the ratchet tooth 122a' in the next order on the basis of the energization of the torsion spring (not shown). However, the speed of the behavior of the engaging and disengaging pawl portion 117b is slower than that of the rotation of the ratchet tooth 122a', thus the tooth tip portion of the ratchet tooth 122a' violently comes into collision with the pawl tip portion of the engaging and disengaging portion 117b in a state in which the engagement surface of the engaging and disengaging pawl portion 117b does not completely face to the engagement surface of the ratchet tooth 122a'. As a result, the collision portions in both the elements are broken by the impact force at the collision time In accordance with the present embodiment, the problems mentioned above can be solved. The stop position at which the lever-shaped engaging and disengaging member 107 in accordance with the present embodiment stops at a time when the engine stops, is various as shown in FIGS. 7 to 9. FIG. 7 shows a state in which the engagement surface of the engaging and disengaging pawl portion 107b of the lever-shaped engaging and disengaging member 107 faces to the engagement surface of the ratchet tooth 122a of the second ratchet portion 122, and the lever-shaped engaging and disengaging member 107 stops. As shown in this FIG. 7, in the case where the engagement surface of the engaging and disengaging pawl portion 107b and the engagement surface of the ratchet tooth 122a face to each other so as to stop, the engagement surface of the engaging and disengaging pawl portion 107b and the engagement surface of the ratchet tooth 122a are immediately brought into contact with each other so as to be engaged, even if the first engaging and disengaging lever 141 is operated so as to disconnect the engagement with the first ratchet portion 121, thereby rapidly rotating the ratchet wheel 120 in the accumulated force releasing direction as shown in FIG. 10. Accordingly, any particular problem is not generated.

On the other hand, for example, as shown in FIGS. 8 and 9, even if the engaging and disengaging pawl portion 107b stops in a state of running on the top portion of the ratchet tooth 122a, or even if the engaging and disengaging pawl portion 107b stops in a state of getting over the ratchet tooth 122a, the side surface shape in the ratchet wheel 120 side of the lever-shaped engaging and disengaging portion main body 107a is formed in the concave surface curved and concaved in the direction away from the ratchet wheel 120 from the center engaging portion over the engaging and disengaging pawl portion 107b. For this reason, the engagement surface of the engaging and disengaging pawl portion 107b faces to the engagement surface of the ratchet tooth 122a' in the next order in the same manner as the state shown in FIG. 9, at a time when the engaging and disengaging pawl portion 107b gets over the ratchet tooth 122a in the previous order on the basis of the rotation of the second ratchet portion 122, whereby the engaging and disengaging pawl portion 107b and the ratchet tooth 122a' in the next order are securely surface engaged. As a result, it is possible to smoothly execute the engaging and disengaging operation between the engaging and disengaging pawl portion 107b of the lever-shaped engaging and disengaging member 107 and the second ratchet portion 122 of the ratchet wheel 120 corresponding to the power transmission mechanism between the engine starting device 100 in accordance with the present embodiment and the engine. In addition, it is possible to prevent the breakage from being generated between the engaging and disengaging pawl portion 107b and the ratchet tooth 122a.

In order to securely achieve the surface engagement between the automatic connecting and disconnecting means and the second ratchet portion, the teeth of the first ratchet portion and the second ratchet portion are arranged so as to have alternate phase differences. On the basis of the phase difference, a slight rotation of the rotation driven portion until the engagement between the first ratchet portion and the engaging and disengaging lever at a time of rotating the rotation drive portion during the force accumulation increases a possibility that the engagement between the engaging and disengaging pawl portion of the engine side automatic connecting and disconnecting means and the second ratchet portion forms the firm surface engagement. Further, even if they are not in the state of the surface engagement, the accumulated force is maintained under the state in which the distance between the engaging and disengaging lever portion and the second ratchet portion is short. As a consequence, they are firmly surface engaged at a time of releasing the accumulated force, and it is possible to securely transmit the drive force on the basis of the accumulated force to the engine.

In this case, the above description is given of the case of accumulating the force in the force accumulating power spring 131 by pulling the recoil rope 115 so as to rotate the power spring barrel drum 130 in one direction via the recoiling reel 116 in the state of engaging the first engaging and disengaging lever 141 with the first ratchet portion 121 of the ratchet wheel 120 of the rotation driven portion M so as to inhibit the rotation in the accumulated force releasing direction, operating the first engaging and disengaging lever 141 so as to cancel the engagement with the first ratchet portion 121 at a time when the accumulated force comes to the sufficient accumulated force to start the engine, and starting the engine while maintaining the engagement between the second ratchet portion 122 and the lever-shaped engaging and disengaging member 107 corresponding to the centrifugal clutch mechanism.

However, it is often the case that the skilled worker avoids starting the engine after previously executing the force accumulating operation of the force accumulating power spring 131 as mentioned above. In the present embodiment, when sliding the slide switch 143 from the left to the right on the half case body 101 as shown in FIG. 8, the first and second engaging and disengaging levers 141 and 142 are respectively disconnected from the ratchet wheel 120 and the power spring barrel drum 130. In this case, the barrel drum 130 is rotated by pulling the recoil rope 115 so as to rotate the recoiling reel 116. Before the sufficient force to get over the maximum load of the engine is accumulated in the force accumulating power spring 131, the rotation of the ratchet wheel 120 stops on the basis of the engagement of the centrifugal clutch mechanism attached to the crank shaft 105 of the engine via the fan 106 with the lever-shaped engaging and disengaging member 107. If the sufficient spring force to get over the maximum load of the engine is accumulated in the force accumulating power spring 131, the ratchet wheel 120 is automatically rotated in the direction of releasing the accumulated force, and the crank shaft 105 of the engine is rotated via the centrifugal clutch mechanism so as to start the engine.

If the pulling operation of the recoil rope 115 is stopped in the middle of the force accumulation, the ratchet wheel 120 and the barrel drum 130 starts backward rotating because the ratchet wheel 120 and the barrel drum 130 are not engaged with the first and second engaging and disengaging levers 141 and 142. Accordingly, the spring force of the force accumulating power sprig 131 accumulated till then is automatically released. As a result, even if the person stops the pulling operation of the recoil rope 115 in the middle and loses hold of the recoil rope 115, the accumulated force in the damping and force accumulating means is naturally released, and there is no risk that the engine is unexpectedly started.

Further, in accordance with the present embodiment, in order to improve a durability of the ratchet wheel 120 mentioned above, an improvement is applied to the shape of the ratchet tooth 121a of the first ratchet portion 121. In general, the ratchet tooth of this kind of ratchet wheel is formed as a flat right angled triangular shape having an engagement surface rising up to an outer side in a diametrical direction from the wheel main body. In the case of the ratchet tooth having the shape mentioned above, even if the ratchet wheel and the ratchet pawl portion engaging with and disengaging from the ratchet wheel are made of the metal, an abrasion is generated in the engaging and disengaging surface of the ratchet tooth 121a and the engaging and disengaging surface of the ratchet pawl portion in accordance with an increase of frequency in engagement and disengagement with respect to the first engaging and disengaging lever 141, so that the engagement is disconnected even by a slight impact. Further, if the pawl portion of the second engaging and disengaging lever 142 is brought into strong contact with a corner portion formed between the rising base end portion of the engaging and disengaging surface of the ratchet tooth 121a and the main body of the ratchet wheel 120, there is a case that a crack toward the center side of the ratchet wheel 120 is generated. In order to solve the problems, a surface hardness has been conventionally increased so as to avoid the abrasion by applying a surface treatment such as a nitriding process or the like to the ratchet tooth 121a and the ratchet pawl portion, particularly to the engaging and disengaging surfaces thereof. However, the problem has not been absolutely solved.

In accordance with the present embodiment, as shown in FIGS. 5 and 6, the engaging and disengaging surface of the ratchet tooth 121a of the first ratchet portion 121 is risen up toward the outer side at a predetermined angle $\alpha$ of slope from the diametrical direction to the engaging and disengaging side. At the same time, a notch portion 121b having a desired length is formed in a corner portion formed between the rising base end portion of the ratchet tooth 121a and the wheel main body toward the wheel center side. The engaging and disengaging surface of the ratchet tooth 121a is risen up while being inclined at the predetermined angle $\alpha$ of slope from the diametrical direction toward the engaging and disengaging side. Consequently, the opposing pawl portion is securely gripped and locked at a time of engaging so as to be prevented from being easily disengaged, on the basis of the angle $\alpha$ of slope in the base portion side of the engaging and disengaging surface, even if the tooth top portion is worn. Further, the notch portion 121b is formed in the corner portion formed between the rising base end portion of the ratchet tooth 121a and the wheel main body. For this reason, the impact force applied to the corner portion is dispersed via the notch portion 121b, the crank or the like is not generated, and the durability is increased.

Figure 20:
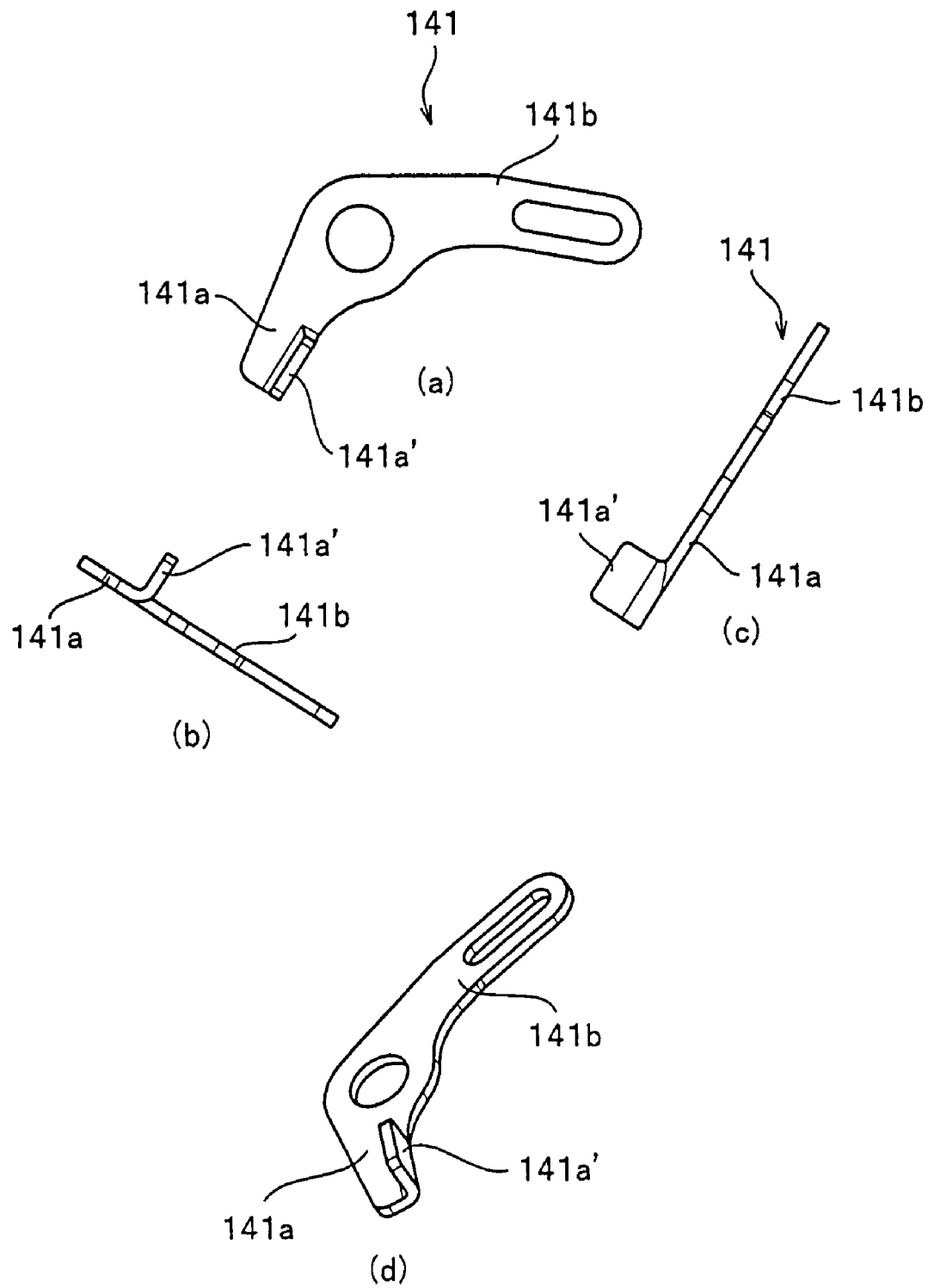
FIG. 20 is a detailed view showing the other embodiment of the first engaging and disengaging lever.

Further, in the case where the first engaging and disengaging lever 141 is manufactured in accordance with a press molding from the sheet metal, in the case where the engaging pawl 141a' is formed by bending the leading end portion of the engaging pawl lever portion 141a at right angle as shown in FIG. 20, it is possible to make an engaging width in a crank axial direction of the engagement portion with the ratchet tooth 121a of the opposing first ratchet portion 121 larger on the basis of the bending length of the engaging pawl 141a'. Thus, it is possible to allow the motion in the crank axial direction to some extent in the engagement portion between the first ratchet portion 121 and the engaging pawl 141a'. Accordingly, it is possible to prevent the engagement from being cancelled by the small external force. In the case where the first engaging and disengaging lever 141 and the first ratchet portion 121 are made of the metal, if the material of the first engaging and disengaging lever 141 is set such that the hardness is lower in comparison with the material of the first ratchet portion 121, the engaging and disengaging lever side is worn in accordance with a repeated use. The abrasion is formed to a shape by which the engagement with the first ratchet portion inhibits the movement in the crank axial direction. Therefore, the engagement becomes further firm.

Figure 17:
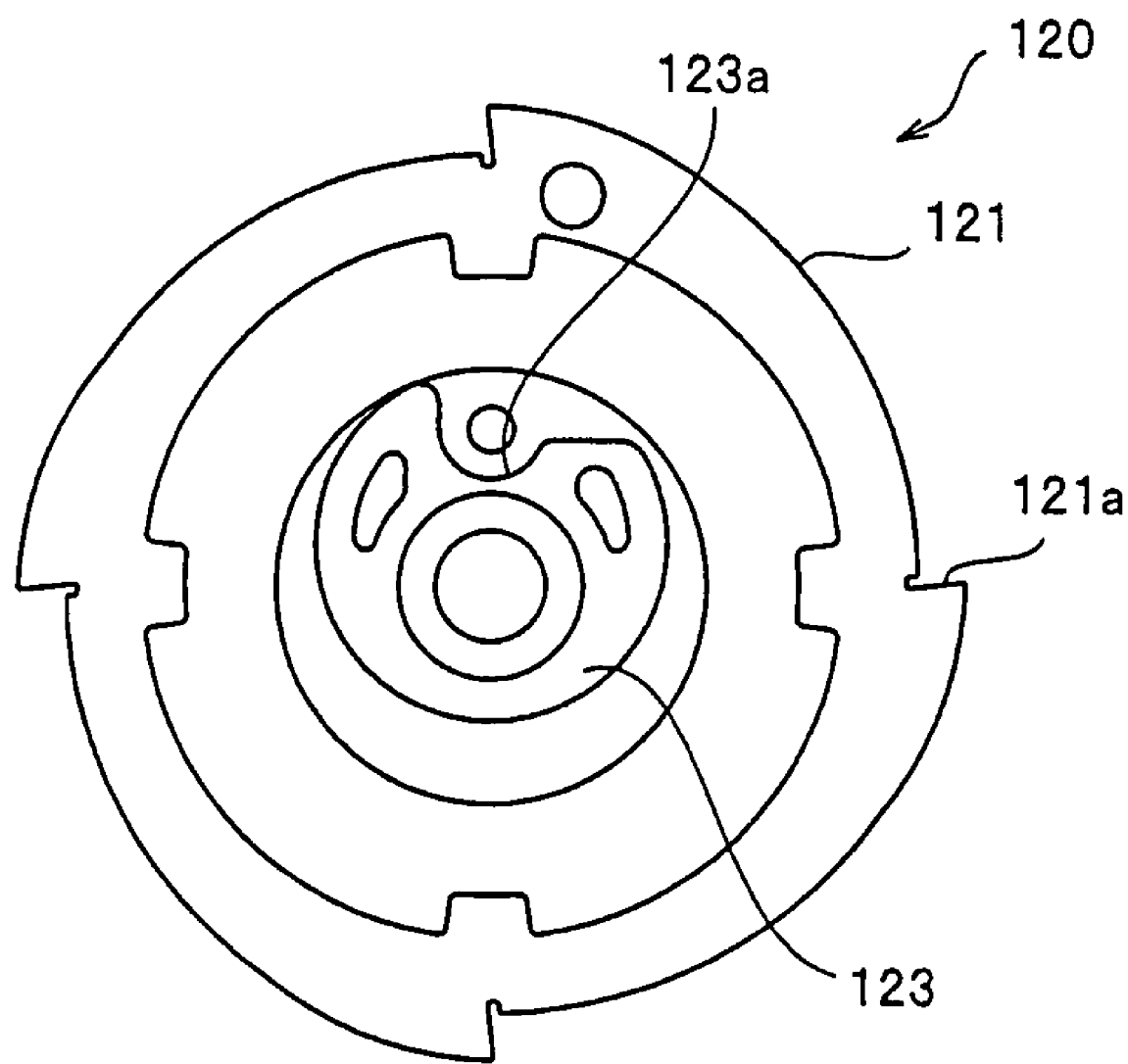
FIG. 17 is a back elevational view showing a modified embodiment of the back face side of the ratchet wheel in the embodiment mentioned above.
Figure 18:
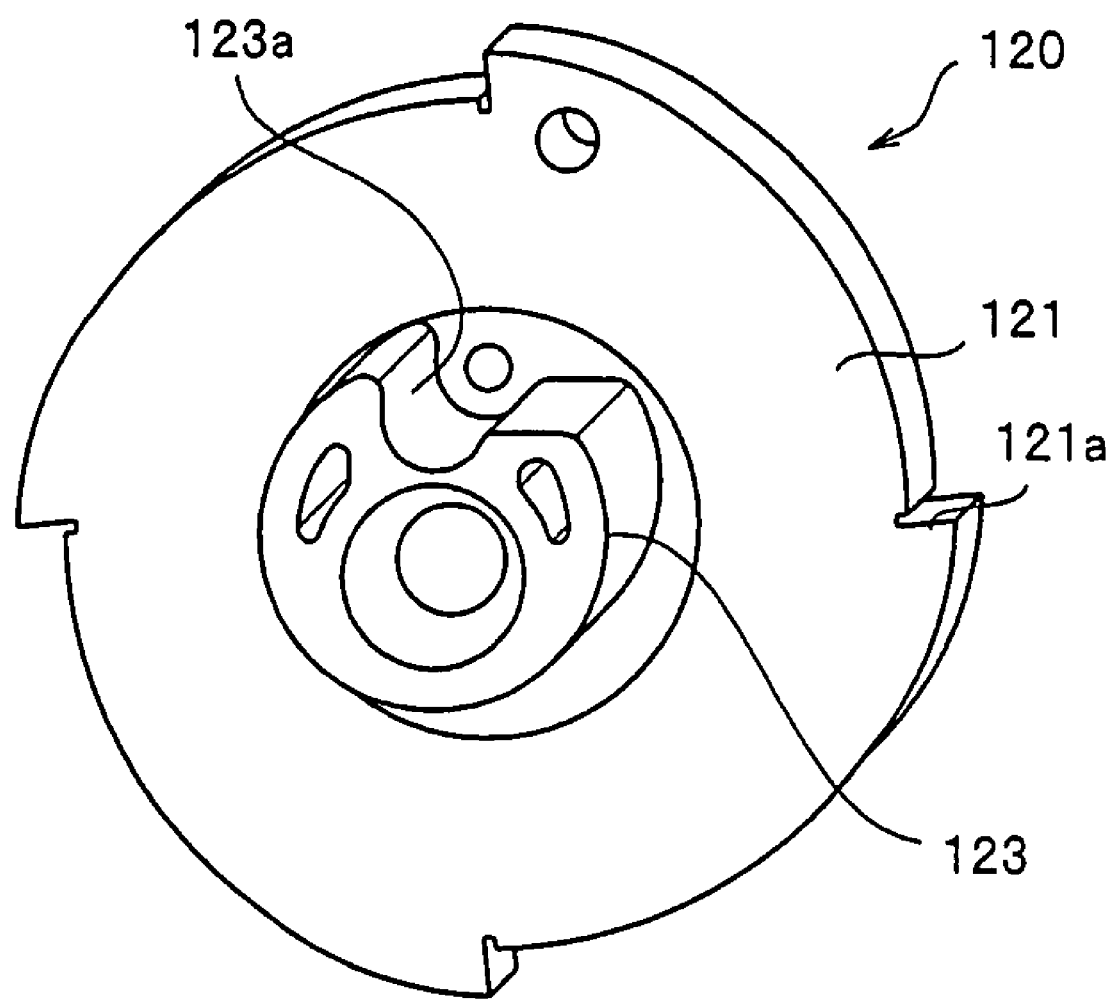
FIG. 18 is a perspective view of the ratchet wheel as seen from a back face.

FIGS. 17 and 18 show a modified example of the U-shaped notch groove 123a of the circular protruding portion 123 formed in the back face side of the ratchet wheel 120. In accordance with the modified example, an approximately inverted-J-shaped notch groove 123b is formed by further notching one shoulder portion of the notch groove 123a. In the same manner as the U-shaped notch groove 123a mentioned above, the inner hook portion 131b of the force accumulating power spring 131 wound in the clockwise direction as seen from the engine side shown in FIG. 7 is fitted and fixed to the notch groove 123b. In the case where the shape of the notch groove is formed in the U shape as mentioned above, in a moment when the second engaging and disengaging lever 142 is disconnected from the ratchet wheel 120 so as to release the accumulated force of the force accumulating power spring 131 as mentioned above, the portion extending astride one shoulder portion of the U-shaped notch groove 123a from the inner hook portion 131b of the force accumulating power spring 131 fitted to the notch groove 123a violently beats the shoulder portion, and damages the inner end hook portion of the force accumulating power spring. Exploring the answer, it has been found that the one should portion is not necessary. Accordingly, in the case of notching the one shoulder portion, the durability of the inner hook portion 131b of the force accumulating power force 131 is improved.

The embodiment mentioned above is configured such that the first and second engaging and disengaging levers 141 and 142 are respectively engaged with and disengaged from the first ratchet portion 121 of the ratchet wheel 120 in the rotation driven portion M and the outer peripheral ratchet tooth 130c of the power spring barrel drum 130 in an interlocking manner. However, in accordance with the present invention, it is possible to exclude the outer peripheral ratchet tooth 130c of the power spring barrel drum 130 and the second engaging and disengaging lever 142 engaging with and disengaging from the outer peripheral ratchet tooth 130c. In this case, the power spring barrel drum 130 is attached to the main shaft 103 via the bearing type one-way clutch.

Figure 19:
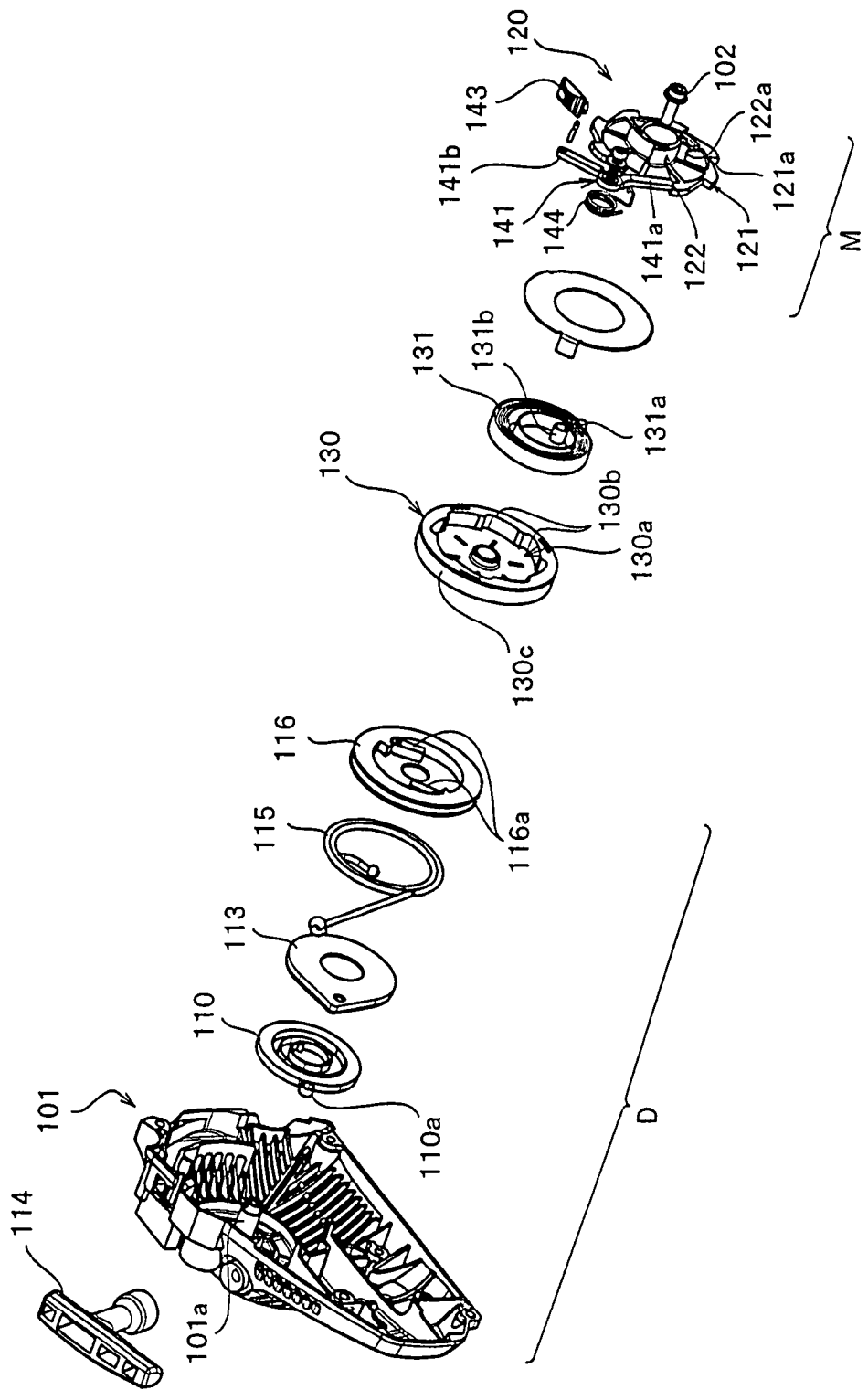
FIG. 19 is an exploded perspective view showing the other embodiment of the engine starting device.

FIG. 19 shows a second embodiment in accordance with the present invention. As is understood from the drawing, the ratchet tooth is not formed in the outer periphery of the power spring barrel drum 130, but a simple smooth peripheral surface is only provided thereon. Further, as is understood by comparing with FIG. 4, the second engaging and disengaging lever 142 does not exist. The other structures are not substantially changed from the embodiment mentioned above. Accordingly, substantially the same aspect as the aspect shown in FIG. 7 is applied to the first engaging and disengaging lever 141 engaging with and disengaging from the large-diameter first ratchet portion 121 of the ratchet wheel 120 in the rotation driven portion M, and the lever-shaped engaging and disengaging member 107 attached to the crank shaft 105 engaging with and disengaging from the small-diameter ratchet portion 122 of the ratchet wheel 120. The shape of the lever-shaped engaging and disengaging member 107 has the shape peculiar to the present invention as shown in FIG. 3.

The rotation driven portion M is provided with the ratchet wheel 120 having the large-diameter and small-diameter first and second ratchet portions 121 and 122, in the same manner as the first embodiment as mentioned above. In the back face of the ratchet wheel 120, the inner hook portion 131b of the force accumulating power spring 131 is fitted and fixed to the U-shaped notch groove 123a formed in the small-diameter circular protruding portion 123, and the first engaging and disengaging lever 141 is engaged with the large-diameter first ratchet portion 121. For this reason, the ratchet wheel 120 is under the stop state until the engagement is canceled. At this time, the lever-shaped engaging and disengaging member 107 (refer to FIG. 3) attached to the crank shaft 105 (refer to FIG. 1) via the fan 107 of the engine (not shown) stops at an undefined position with respect to the ratchet tooth 122a of the small-diameter second ratchet portion 122 as shown in FIGS. 7 to 9. Under this state, in the same manner as the first embodiment mentioned above, the engagement between the first engaging and disengaging lever 141 and the large-diameter first ratchet portion 121 of the ratchet wheel 120 is disconnected by operating the slide switch 143.

In this case, the power spring barrel drum 130 is rotated in the force accumulating direction by pulling the recoil rope 115 so as to rotate the recoiling reel 116, the sufficient spring force is stored in the force accumulating power spring 131, and the accumulated force reaches the sufficient force to start the engine. At this time, the rotating force is transmitted to the crank shaft 105 of the engine via the centrifugal clutch mechanism (not shown) via the ratchet wheel 120 of the rotation driven portion M, and the engine is automatically started.

On the contrary, when sliding the slide switch 143 existing in the right side on the half case body 101 to the left side, the first engaging and disengaging lever 141 is engaged with the first ratchet portion 121 of the ratchet wheel 120 on the basis of the application of the elastic force of the torsion spring 144. Under this state, in the case of pulling the recoil rope 115 so as to rotate the recoiling reel 116, it is possible to rotate the power spring barrel drum 130 in the force accumulating direction. However, the rotation in the opposite direction is inhibited by the one-way clutch (not shown), and at the same time, the ratchet wheel 120 of the rotation driven portion M is absolutely stopped rotating. Accordingly, in the case of pulling the recoil rope 115 so as to rotate the recoiling reel 116, the power spring barrel drum 130 is rotated and only the accumulated force is stored in the force accumulating power spring 131.

Therefore, even if the person stops the pulling operation of the recoil rope 115 in the middle and loses hold of the recoil rope 115, the accumulated force is held in the force accumulating power spring 131 between the power spring barrel drum 130 and the ratchet wheel 120 as it is. Accordingly, for example, in the pulling operation by the weak person and in the place where the pulling operation of the recoil rope 115 is not freely executed, the engine can be instantaneously started by sliding the slide switch 143 mentioned above to the right side as shown in FIG. 7, and rotating the first engaging and disengaging levers 141 in the clockwise direction so as to detach from the first ratchet portion 121, after pulling the recoil rope 115 at several times and storing the sufficient spring force to start the engine in the force accumulating power spring 131. The shape of the lever-shaped engaging and disengaging portion main body 107a keeps the special shape of the present invention whatever position the engaging and disengaging pawl portion 107b of the lever-shaped engaging and disengaging member 107 in the engine side engaging with the second ratchet portion 122 exists as mentioned above, at this starting time. As a consequence, it is possible to always accurately achieve the surface engagement with the second ratchet portion 122, and it is possible to avoid the matter that the leading end of the ratchet tooth 122a and the leading end of the engaging and disengaging pawl portion 107b are broken. Further, it is possible to securely know on the basis of the informing signal generated by the operation of the torque limiter means mentioned above whether or not the accumulated force stored in the force accumulating power spring 131 reaches the sufficient force to start the engine.

As mentioned above, in accordance with the present embodiment, the recoiling reel 116 is rotated in the engine rotating direction on the basis of the pulling operation of the recoil rope 115 of the rotation drive portion D by sliding the slide switch 143 on the surface of the half case body 101. Thereby, the desired spring force is accumulated in the force accumulating power spring 131 while rotating the power spring barrel drum 130 of the damping and force accumulating means in the same direction, the accumulated force is directly transmitted to the ratchet wheel 120 corresponding to the rotation driven portion M, and the accumulated force reaches the necessary and sufficient force to start the engine, it is possible to automatically start the engine. In addition, if the slide switch 143 is slid in the inverse direction, it is possible to previously store the spring force necessary for starting the engine in the force accumulating power spring 131 by pulling the recoil rope 115 of the rotation drive portion D and rotating the power spring barrel drum 130 in the same direction. Under the state in which the accumulated force is held, it is possible to release the accumulated force stored in the force accumulating power spring 131 in the optional place at the desired time and it is possible to instantaneously start the engine on the moment.

Moreover, in the case of starting the engine at the optional timing in accordance with the operation of the slide switch 143, it is possible to smoothly achieve the engagement between the second ratchet portion 122 of the ratchet wheel 120 in the centrifugal clutch mechanism serving as the power transmission mechanism in accordance with the present invention and the engaging and disengaging pawl portion 107b of the lever-shaped engaging and disengaging member 107 in the engine side. Further, it is possible to more securely avoid the conventional breakage in the tooth tip portion of the ratchet tooth 122a and the pawl tip portion of the engaging and disengaging pawl portion 107b on the basis of the peculiar shape of the lever-shaped engaging and disengaging member 107.

In this case, in each of the embodiments mentioned above, the material of the lever-shaped engaging and disengaging member 107 is set to the metal material. However, it is possible to change the shape thereof, and it is possible to form the lever-shaped engaging and disengaging member 107 by the plastic material as far as the hardness and the strength can be secured.

The invention claimed is:

1. A power transmission mechanism between an engine starting device and an engine, comprising:
   a first actuator storing an energy to start the engine through a first external operation; and
   a second actuator in which a damping and force accumulating means is interposed in a power transmission system between a rotation drive portion and a rotation driven portion, a power of the drive portion is accumulated between the damping and force accumulating means and the rotation driven portion, the accumulated force is released by canceling a lock of the rotation driven portion at a desired time, and the engine is started via an automatic connecting and disconnecting means arranged between the rotation driven portion and the engine, wherein
   the damping and force accumulating means has a power spring barrel drum and a power spring having one end supported to the barrel drum, and the rotation driven portion supports the other end of the power spring and is provided with a first engaging and disengaging lever engaging and disengaging in accordance with a second external operation so as to lock or unlock a rotation in one direction of the rotation driven portion, a first ratchet portion having a plurality of ratchet teeth engaging with and disengaging from the first engaging and disengaging lever, and a second ratchet portion having a plurality of ratchet teeth engaging with and disengaging from the automatic connecting and disconnecting means,
   the power spring barrel drum is provided with a second engaging and disengaging lever engaging and disengaging in cooperation with the first engaging and disengaging lever in accordance with the second external operation so as to lock or unlock a rotation in one direction of the power spring barrel drum, and a third ratchet portion having a plurality of outer peripheral ratchet teeth engaging with and disengaging from the second engaging and disengaging lever,
   the automatic connecting and disconnecting means is pivotally supported to a member working with an engine rotation in a pivotally attached portion, has an engaging and disengaging pawl portion in a leading end, has a lever-shaped engaging and disengaging member energized in such a direction that the engaging and disengaging pawl portion engages with the second ratchet portion, and is provided with a centrifugal clutch function such that when the crank shaft of the engine reaches a desired rotating speed, the lever-shaped engaging and disengaging member rotates against the energization on the basis of a centrifugal force, and the engagement between the engaging and disengaging pawl portion and the ratchet tooth of the second ratchet portion is automatically disconnected, and
   a side surface in a side facing to the ratchet tooth of the second ratchet portion of the lever-shaped engaging and disengaging member has a shape concaved in a direction opposite to the direction for energizing the engaging and disengaging pawl portion,
   wherein the first external operation and the second external operation are performed independently.

2. A power transmission mechanism as claimed in claim 1, wherein the engaging and disengaging pawl portion formed in the leading end portion of the lever-shaped engaging and disengaging member and the ratchet tooth of the second ratchet portion are engaged by a surface contact.

3. A power transmission mechanism as claimed in claim 1, wherein the ratchet tooth of the first ratchet portion and the ratchet tooth of the second ratchet portion are arranged at a predetermined phase difference.

4. A power transmission mechanism as claimed in claim 1, wherein the first engaging and disengaging lever and the first ratchet portion are made of a metal material, and an engaging and disengaging surface of the ratchet tooth of the first ratchet portion with the first engaging and disengaging lever has an angle of slope smaller than 90 degrees between the engaging and disengaging surface and the peripheral surface of the ratchet main body.

5. A power transmission mechanism as claimed in claim 4, wherein a surface hardness of the first engaging and disengaging lever is set lower than a surface hardness of the ratchet tooth of the first ratchet portion.

6. A power transmission mechanism as claimed in claim 4, wherein the first engaging and disengaging lever is obtained in accordance with a press molding of a sheet metal, is entirely formed in an L shape, and is bent at 90 degrees in one end so as to form the engaging and disengaging pawl.

7. A power transmission mechanism as claimed in claim 1, wherein the automatic connecting and disconnecting means comprises two lever-shaped engaging and disengaging members having the centrifugal clutch function that are arranged in a point symmetrical manner with respect to a center of rotation of the crank shaft.

8. A power transmission mechanism as claimed in claim 2, wherein the ratchet tooth of the first ratchet portion and the ratchet tooth of the second ratchet portion are arranged at a predetermined phase difference.

9. A power transmission mechanism as claimed in claim 5, wherein the first engaging and disengaging lever is obtained in accordance with a press molding of a sheet metal, is entirely formed in an L shape, and is bent at 90 degrees in one end so as to form the engaging and disengaging pawl.

10. A power transmission mechanism as claimed in claim 2, wherein the automatic connecting and disconnecting means comprises two lever-shaped engaging and disengaging members having the centrifugal clutch function that are arranged in a point symmetrical manner with respect to a center of rotation of the crank shaft.

11. A power transmission mechanism as claimed in claim 3, wherein the automatic connecting and disconnecting means comprises two lever-shaped engaging and disengaging members having the centrifugal clutch function that are arranged in a point symmetrical manner with respect to a center of rotation of the crank shaft.

12. A power transmission mechanism as claimed in claim 4, wherein the automatic connecting and disconnecting means comprises two lever-shaped engaging and disengaging members having the centrifugal clutch function that are arranged in a point symmetrical manner with respect to a center of rotation of the crank shaft.

13. A power transmission mechanism as claimed in claim 5, wherein the automatic connecting and disconnecting means comprises two lever-shaped engaging and disengaging members having the centrifugal clutch function that are arranged in a point symmetrical manner with respect to a center of rotation of the crank shaft.

14. A power transmission mechanism as claimed in claim 8, wherein the automatic connecting and disconnecting means comprises two lever-shaped engaging and disengaging members having the centrifugal clutch function that are arranged in a point symmetrical manner with respect to a center of rotation of the crank shaft.

\* \* \* \* \*